(12) United States Patent
Pena

(10) Patent No.: US 6,704,039 B2
(45) Date of Patent: *Mar. 9, 2004

(54) METHOD AND SYSTEM FOR COMPUTER-AIDED TELECOMMUNICATION AND FINANCIAL TRANSACTIONS

(76) Inventor: Martin Rangel Pena, 11039 Painted Tree Rd., Charlotte, NC (US) 28226

( * ) Notice: Subject to any disclaimer, the term of this patent is extended or adjusted under 35 U.S.C. 154(b) by 0 days.

This patent is subject to a terminal disclaimer.

(21) Appl. No.: 09/954,803

(22) Filed: Sep. 18, 2001

(65) Prior Publication Data

US 2002/0024590 A1 Feb. 28, 2002

Related U.S. Application Data

(63) Continuation-in-part of application No. 09/419,729, filed on Oct. 16, 1999, now Pat. No. 6,292,211.

(51) Int. Cl.[7] ................................................. H04N 7/14
(52) U.S. Cl. .............................. 348/14.01; 348/14.08; 379/93.24
(58) Field of Search .......................... 348/14.01–14.09; 349/90.01, 93.24, 100.01; 345/329, 330; 709/204, 205, 206; 705/42, 43

(56) References Cited

U.S. PATENT DOCUMENTS

| 5,872,922 A | * | 2/1999 | Hogan et al. ................ 709/204 |
| 6,085,177 A | * | 7/2000 | Semple et al. ................. 705/43 |
| 6,173,272 B1 | * | 1/2001 | Thomas et al. ................ 705/42 |

* cited by examiner

Primary Examiner—Melur Ramakrishnaiah
(74) Attorney, Agent, or Firm—Dorothy S. Morse

(57) ABSTRACT

A computer-aided telecommunication system and method which employs an on-line website to allow those skilled and unskilled in computer operation to communicate with others and conduct diverse financial transactions at any time and from any computer. Subscribers and others can conduct real-time visual communication with remotely located parties, exchange still and moving images, and distribute written information at a cost that is low when compared to alternative forms of communication. The system comprises a minimum of two control stations, one privacy booth and one e-mail station adjacent to each control station, and many remote e-mail/ATM stations placed in secure monitored locations. Each subscriber is assigned a unique access code and e-mail address, and undergoes identity confirmation procedures prior to system use. For ease of e-mail communication, subscribers would only need the name of an intended recipient subscriber or subscriber group identification and not individual e-mail addresses.

53 Claims, 15 Drawing Sheets

METHOD AND SYSTEM FOR COMPUTER-AIDED TELECOMMUNICATION AND FINANCIAL TRANSACTIONS

RELATED APPLICATIONS

This patent application is a continuation-in-part based upon a previously filed patent application, Ser. No. 09/419,729 to the same inventor, and benefit U.S. Pat. No. 6,292,211, filed Oct. 16, 1999 of the previously filed patent application is herein requested.

BACKGROUND

1. Field of Invention

This invention relates to telecommunication and money transfer systems, specifically to a computer-aided system and method which employs an on-line website and a plurality of computers to create a subscriber network for use by skilled and unskilled computer operators alike from any computer or computer device anywhere and at any time, including personal computers in the home and office, hand-held personal digital assistants, and mobile phones, as well as any other device adapted to permit on-line access. The majority of users would be subscribers, although non-subscribers would have a more limited selection of services available on a unit cost basis. The present invention offers those unskilled in computer operation, as well as those who do not have a convenient means immediately available for computer or on-line access, the opportunity to transfer written information, images, and money to remote subscribers and others, including the transfer of notices about events, sales, and employment opportunities directed to more than one recipient; the conduct of real-time visual communication with one another; secure money transfer between individuals; make purchases, and also optionally receive still and/or moving images of remote correspondents at a cost that is relatively low when compared to alternative forms of communication. In addition those skilled in computer operation can optionally access the established subscriber network from any personal computer or other digital device permitting on-line access, a privacy booth, one of the network control stations, a network-connected local e-mail station, or one of many network-connected remote e-mail/ATM stations, to accomplish a wide variety of communication and financial transactions, including but not limited to sending money to remote individuals, paying bills, cashing checks, issuing paychecks, exchanging currencies, purchasing pre-paid telephone cards, purchasing pre-paid debit cards, purchasing money orders, purchasing transportation or entertainment tickets, purchasing goods and services such as groceries and gas, purchasing pre-paid software applications, purchasing bandwidth to send large files or for videoconferencing purposes, and pre-paying entertainment costs. Fast and private money transfer between one or more donating subscribers and one or more recipients remote from the donor, with on-camera money transfer confirmation, can take place in specially equipped privacy booths. The recipient does not have to be a subscriber. Money transfer can also take place between individuals whereby money is directly deposited in a bank or credit union account of another, or the money is made available for pick up, all or part thereof, via any remote e-mail/ATM station, control station, or local e-mail station also having ATM capability. At the option of the recipient, money pick up can be in the form of cash, pre-paid phone cards, prepaid debit cards, money orders, or other currency equivalent. Since personal identity confirmation is required for most transactions, personal home computer systems used for subscriber network access must have video communication equipment, such as a netcam. Stand-alone network-accessing units, such as remote e-mail-ATM stations, should each have video-recording and automated teller machine capability, and would be strategically placed in secure well-lighted locations, such as but not limited to convenience stores, grocery stores, drug stores, shopping malls, hotel lobbies, restaurants, theaters, bus stations, and airports. Certain cash transactions, such as the purchase of a pre-paid phone card or money order, could be completed by non-subscribers at stand-alone network accessing units. However, for most transactions at least the donor would be a network subscriber. As part of the application process for becoming a network subscriber, a digital photograph of the person is taken and entered into the network's computer database, along with other identifying information about the subscriber, such as but not limited to social security number, full name, birth date, and/or full address and telephone number. Additional layers of security can also be employed as part of the application process on an as needed basis, including but not limited to the taking of one or more fingerprints and establishing voice recognition patterns. Thereafter, subscriber wanting to perform a variety of financial transactions through use of the present invention, whether positioned in front of his or her own computer, a local e-mail station with ATM capability located at one of the network offices where privacy booths are also located, or in front of a stand-alone remote e-mail/ATM station network accessing unit, can do so by simply entering a discrete password and allowing the system to take a current digital photograph, fingerprint, and/or voice pattern sample and compare it to the digital photograph and other data already on file in its computer database. If currently collected data matches that originally collected upon registration as a subscriber, then the subscriber is permitted access to the network to accomplish any service for which pre-payment has been made. If current and original data do not match, network access is denied and compliance with further network procedures must be achieved before the person requesting network access can be permitted use of network services. When money is transferred to another person, the recipient will receive a message about the transfer via e-mail, pager, voice mail, or mobile phone, whereafter the recipient can proceed to the nearest network-accessing unit having automated teller machine capability to obtain all or part of the transferred money. If only part of the money is withdrawn from the subscriber network, the remainder can be maintained within the network indefinitely until recipient chooses to withdraw it. Further, a video screen, microphone, camera, and speaker or speakers associated with an e-mail station in a network office housing privacy booths, or as part of a stand-alone remote network-accessing unit, can further assist subscribers by providing full motion video customer service and alternatively provide the network with the opportunity for revenue generation through full motion video advertising. The simplest preferred embodiment of the subscriber system comprises two central processing units; two computer monitors; four keyboards; two printers; two printer/scanner/fax/copier combination units unless separate equipment for printing, scanning, faxing, and copying is alternatively made available for use; two video recorders; at least two privacy booths in which to conduct visual conferences, each having a high resolution monitor, a live video capture camera, audio speakers, at least one microphone, an optional writing surface, and at least one piece of furniture which can comfortably seat visual correspondents; and a plurality of network-accessing units each having video-recording capability that are strategically placed in secure locations to facilitate money transfer and other financial transactions.

2. Description of Prior Art

Recent technological advances have made worldwide communication between many remotely located business associates, friends, and family members nearly instantaneous and relatively easy to accomplish. Also, for those having computer skills and inexpensive on-line computer access, the cost of such communication has been dramatically lowered. However, there are people who lack computer skills, those who travel frequently or become temporarily relocated for periods of time too short to establish or transfer local telephone service, and those who lack the ability to purchase the computer hardware and software necessary for online access, who have not been able to take advantage of this technology. These people find alternative forms of communication expensive, subject to delay, and often totally inadequate when an important letter or package is not delivered to the intended recipient in its original condition or is never delivered at all.

Non-Internet communication between people in different countries can be particularly difficult. A letter traveling to someone in a remote location can take two weeks or longer for delivery. Weak law enforcement and corruption can further complicate the process and place money transfer between friends and family members in different countries at particularly high risk. For example, newspaper articles have cited the disappearance of millions of dollars sent annually by migrant workers in the United States to their families in Mexico. U.S. Postal Service money orders are used to send approximately one-third of such funds, and during the period between 1988 and 1998 claims alone for lost and stolen U.S. Postal Service money orders increased six-fold to more than $12 million. False identification is often used to divert the funds from the intended recipient. Violent gangs, as well as corrupt money exchangers, postal workers, and police, have been found responsible for perpetuating the problem. A secure means for transferring money between remotely located friends and family members, particularly when friends and family members are located in different countries, is much needed.

The present invention brings a solution to the existing problem by offering to those who may be unskilled in computer operation, or not otherwise in a position to use computer technology, a way of accessing it so as to have instant communication with remotely located friends and family members, rapid transfer of money from one to the other, and also instant transfer of up-to-date still and/or moving images from one to the other at a cost that is relatively low when compared to alternative forms of communication. In the alternative, it can also provide a means for any subscriber through a personal computer at home or in the office, other personal digital device permitting on-line access, or remote e-mail/ATM station, to conduct a wide variety of purchases and other financial transactions. The temporary or permanent relocation of family members sometimes places a heavy burden on those affected by the separation. Having visual contact with remote loved ones during a voice communication or for a special occasion would bring added pleasure and peace of mind to both parent, grandparent, child and/or grandchild, when each can see for themselves that the person with whom they are communicating appears to be in good health. Although visual contact could be accomplished by existing methods of videoconferencing, such methods are generally too expensive to be widely used for such non-business communication and data transfer. In addition, existing videoconferencing methods have no provision for money transfer between the participants.

Other disadvantages are also inherent in the alternative prior art methods available for communication between separated family members and friends. While written communication can be one of the least expensive options, travel delays are common in getting a written message to remote recipients, one must have a continually updated street or post office box address for successful delivery which is not always possible, and written messages are time consuming to compose. Further, letter writing is not a task enjoyed by everyone. Courier services and overnight mail can be used to help to insure more rapid and secure delivery of written communications, but at a premium cost that can make such services great for businesses but unaffordable by most individuals for routine use. Telephone communication has the advantage of being immediate, however a person long separated from his family often cannot afford the luxury of frequent videoconferencing communication and even routine long distance charges may be cost prohibitive for use as often as separated family members might like to remain in contact, particularly when international telephone calls are necessary. Other forms of communication, including the sending of audio and/or videotapes to one another, short-wave radio communication, faxing, and e-mail, all require the availability of expensive electronic equipment for both the sender and recipient. Another factor to assess in the use of electronic communication equipment is the minimum skill level required for people to operate it. There are those who are technically unskilled and would not be able to effectively use the simplest devices available for use. Further, in the alternative when unskilled senders and/or recipients rely on currently available outside technical sources for faxing, short-wave radio communication, or e-mail services, the privacy of the communication may be compromised. While an increasing number of people are becoming computer literate and starting to rely on computers for a significant part of their communication needs, there are still those without adequate computer skills who cannot take advantage of this type of communication, and those for whom family separation has imposed at least a temporary financial burden which makes the purchase or lease of computer equipment for both correspondents unfeasible. At this time there is no known communication system or method that is low in cost to the user, private, immediate, and allows the transfer of up-to-date still and moving images between correspondents.

In addition, money transfer and other financial transactions between remotely located family members and friends, or for their benefit, is often needed and poses its own set of challenges. Money exchange through the mail is slow and frequently places the money at risk for loss. Inter-bank transactions can enhance transfer security, however they can be expensive and delays in money distribution are known to occur. Money can also be wired to individuals, however, delays can be encountered when codes are forgotten and misdirection of funds has been known to happen, many times through fraud. Where family members or friends are remotely situated from one another and have the need to periodically communicate, it would be useful to have a technologically sophisticated means for combining a videoconferencing type of communication with the prompt transfer of money, and to have such communication and money transfer available without requiring any of the senders or recipients to have computer expertise or purchase expensive equipment. It would also be helpful if the same system offered those with independent computer access a means for conducting a wide variety of financial transactions. No other system and method are known that functions in the same manner or provides all of the advantages of the present invention.

SUMMARY OF INVENTION

Objects and Advantages

It is the primary object of this invention to provide a computer-aided system and method which can be used by separated family members and others, whether computer literate or not, to visually communicate with one another, transfer money from one to the other, transfer up-to-date still and moving pictures between them, and conduct a variety of financial transactions without having to purchase expensive computer and/or other electronic equipment to do so. It is also an object of this invention to provide a computer-aided communication system and method that will let a person who is not necessarily computer literate to send and receive confidential e-mail messages. A further object of this invention is to provide a computer-aided communication system and method which can provide telecommunication, money transfer, opportunity for conducting financial transactions, and transfer of up-to-date still and moving images at a cost to the user that is lower than that of prior art telecommunication systems. It is also an object of this invention to provide a computer-aided communication system and method that protects the privacy of all communications between users. It is a further object of this invention to provide a computer-aided communication system and method that is capable of automatically giving users a printed copy of all e-mail messages that are transmitted to them and allows them to confidentially send pre-written e-mail messages. It is also an object of this invention to provide a computer-aided communication system and method that allows a user to exchange information with all system subscribers if desired, such as information about items for sale, upcoming events, and available jobs, and for subscribers to screen such information in private. It is a further object of this invention to provide a computer-aided communication system and method that allows some transactions at remote e-mail/ATM stations by non-subscribers, and permits subscribers to communicate with and send money to non-subscribers.

As described herein, the present invention would provide a computer-aided system and method for telecommunication that would allow separated people who may not have sophisticated computer skills or state-of-the-art computer equipment of their own to schedule real-time long distance visual communication with one another, to conduct such communication in private, to effect prompt and secure transfer of money from one user to another, to transfer up-to-date still and moving images between users, and conduct a variety of financial transactions. Those who are not subscribers could use network-connected remote email/ATM stations to conduct a limited number of services in exchange for a prepaid transaction fee. A more diverse selection of services would be available on a prepaid basis to subscribers who have submitted personal identity-confirming information for storage within the network database and to be used for identity confirmation purposes at each subsequent occurrence of attempted network access. An on-line computer-accessed website would be provided for the communication link so that local telephone numbers can be used and long distance charges avoided, and so that other information can be exchanged between subscribers such as e-mail and information about items for sale, upcoming events, and available jobs. It is contemplated for the system to comprise a minimum of two control stations, at least one privacy booth in the vicinity of each control station, a local e-mail station with optional ATM capability in the vicinity of each control station, and a plurality of remote e-mail/ATM stations each placed in a secure monitored location, such as a restaurant, bar, or hotel lobby, to prevent theft or vandalism. Once the people desiring such communication have subscribed to the service and paid the designated subscription fee, each would be given a unique access code and assigned a unique e-mail address that would be added to a computer database of subscribers. Subscriber information would also be collected and added to the computer database, including a digital photograph of the subscriber, as well as one or more fingerprints, a sample of the subscriber's speech patterns, and/or additional information about the subscriber when additional layers of security are desired, such as when identical twins or triplets want to simultaneously become subscribers. Thereafter, when a subscriber desires access to the network and enters a password on a personal computer, personal digital device, via a control station, through a local e-mail station, or through a remote e-mail/ATM station, a current digital photograph of the person attempting access is taken and compared to the original digital photograph stored in the computer database. In the most preferred embodiment of the present invention fingerprint scanning and voice recognition would only be required of the subscriber when photo identification is problematic. Upon successful identification of the person as a network subscriber, he or she is provided with instant access to all services for which a monthly fee has been pre-paid. Optionally, digital photographs could also be taken of non-subscribers using the subscriber network on a per transaction fee basis for limited services and maintained for a predetermined period of time after which they would be purged from the network database.

Subscribers remote from one another would be able to schedule videoconferences in advance, at regular intervals when desired. Immediately prior to the scheduled visual conferencing time, each subscriber or group of subscribers would be given an enclosed room by a local technician in which to conduct the visual communication in private, equipped at a minimum with a high resolution monitor, a live video capture camera, one or more audio speakers, at least one microphone, a writing surface, and at least one piece of furniture to comfortably seat them. A telephone and pneumatic tube could be provided when additional customer service options are desired. Computer equipment function for the visual communication would be handled by a skilled computer technician located at each network office where a subscriber intending to be a part of the visual communication. In the preferred embodiment an independent e-mail station in proximity of the privacy booths but not connected directly to it, would allow subscribers to independently access written e-mail messages or still images sent to them by another subscriber, and receive a printed copy of each such message. No technician would be required. A variety of financial transactions could also be accomplished at this type of local e-mail station, particularly when it also had ATM capability. To send an e-mail message to another subscriber, all a subscriber would have to do is type their unique password on a keypad, also type the name of the intended recipient subscriber on the keypad, and then insert the written message or picture into the scanner provided. A local or networked central processing unit would access the subscriber database, determine from the database the appropriate e-mail address of the intended recipient subscriber or subscribers, direct the scanner to scan the written message, and then send the scanned image to the named recipient subscribers' e-mail addresses without creating a file for the image elsewhere in the computer's memory, after which it would direct the scanner to return written message or picture to the sending subscriber. The transmittal would be prompt and the privacy of the communication would not be compromised. Should a subscriber want help in sending a private pre-written e-mail message to another subscriber, it could be given to a technician at the local control station with the names of the intended recipients and the transmitting subscriber's unique access code. The message or picture would then be scanned unread by the technician, automatically transmitted by the computer to the e-mail addresses of the intended recipient subscriber or group of recipient subscribers without creating a computer file for the transmitted message other than at the e-mail address of the intended recipient subscribers, after which the technician would return the written message unread to the transmitting subscriber. After the recipient subscriber accesses each e-mail message, in the preferred embodiment the computer would automatically delete the message from the recipient subscriber's e-mail address unless directed not to do so by the recipient subscriber, thus preserving the privacy of personal communications. The network subscription fee could include a predetermined number of e-mail transmittals during a pre-set period of time without additional charge, which would be monitored by the computer through the subscriber database, or in the alternative subscribers could be allowed the option of paying a set fee for each e-mail transmission. E-mail messages would be accessible by the recipient subscriber without paying a fee, any such expenses being covered by the fee paid by the transmitting subscriber. In the alternative, e-mail messages could be sent and received through remote email/ATM stations each having a scanner, a printer, a display screen, and a keypad for data entry. Upon entry of an access code and/or the payment of a fee, a written message could be scanned, automatically sent to the e-mail address of the recipient, and promptly returned to the sender without having a computer file made for the message in any other location than the email address of the intended recipient subscriber or subscribers. Sending subscribers would only need to remember and type their own access code, in addition to the name of the user. They would not be required to know the e-mail address of the recipient subscribers. To receive messages, receiving subscribers would only have to type their own unique access code on a keyboard or keypad, after which the computer would automatically direct all messages at the recipient subscriber's e-mail address to be automatically printed for the recipient subscriber. If the e-mail address contained no messages, it is contemplated that the recipient subscriber would be given a written message so indicating the lack of messages so there would be no question in the mind of the recipient subscriber as to whether messages had been received. Also, after printing, it is contemplated for the computer to automatically delete the message unless instructed by the recipient subscriber to retain it for a short period of time. It is contemplated at a minimum for e-mail stations placed in locations remote from a control station to have scanners, keyboards, and printers for the private transfer of previously composed messages, letters, and/or pictures. Any of the e-mail stations could also comprise an automated teller machine (ATM) so that people wanting to send money during a visual communication or to pay for the transmittal of e-mail messages would have the funds available to do so. It is contemplated that remotely located e-mail/ATM stations would be placed in supervised locations, such as in other business establishments to include but not limited to restaurants, hotels, bars, convenience stores, grocery stores, drug stores, shopping malls, theaters, bus stations, and airports.

To exchange money during a website visual communication of the present invention, the two corresponding subscribers would decide on an amount to be transferred in front of two network technicians. Then within view of the camera the donating subscriber would hand the designated amount of money to a technician present at his or her user location. At the recipient subscriber's location, the recipient's local technician would count a sum of money identical to that given by the donating subscriber to his or her local technician and hand it to the recipient subscriber on camera, after which the recipient subscriber would sign documentation confirming his or her identity as well as receipt of the designated amount. In the alternative, a digital photograph could be taken of the donating and recipient subscribers for confirmation purposes. Depending upon the amount of money to be transferred, a technician at the recipient's location would then on camera give the recipient the designated amount of money if it is a small sum, or in the alternative a check or other type of easily cashed voucher would be handed to the recipient on camera. Monetary exchange would be prompt and the donating subscriber would have real-time confirmation that the money transfer had been made. In the alternative, particularly if the recipient subscriber was to be transferred a large amount of cash and did not have a bank account to use in cashing the check, the recipient would have the option to choose one of several pre-selected banks through which prior arrangements had been made and that had agreed to release funds to such recipients within a short period of time after receipt of a communication from the local technician that included the recipient subscriber's picture and an identification of the amount to be transferred to the recipient subscriber. A further money transfer alternative could involve the local and remote e-mail and e-mail/ATM stations. One procedure would involve the donor arranging money transfer by filling out a standardized money transfer form and paying a local technician the amount to be transferred, after which a copy of the form would be e-mailed to the intended recipient subscriber. A security code known only to the recipient subscriber but not included on the e-mailed copy of the form could be added to the original form by the technician for later verification. When the recipient subscriber receives the e-mailed form, he or she would take it to a local control station. After the recipient subscriber's local technician verifies the security code through the donating subscriber's local technician. The funds would be released to the recipient subscriber as cash, a negotiable instrument, or as a result of the recipient subscriber's local technician sending a visual image of the recipient to a cooperating bank. Other variations in money transfer using the present invention can involve recipient notification of money transfer via e-mail, pager, voice mail, or mobile phone message, whereafter the recipient contacts the donor for the code required for money access. Should either of the visual correspondents desire a up-to-date still or moving picture of the others with whom he or she is communicating, the technician at the location of the subscriber wanting the image can activate video-recording equipment at any designated time during the visual communication and thereafter provide the image or images to the user before he or she departs the premises. A window in the privacy booth, or a signal light on the outside of the booth in view of a technician at the control station, could be used to signal the technician of the appropriate time to begin image capture. The image preservation, as well as all communication, would be accomplished through computer software programming and to insure privacy for the users, and no record of the communication except the copy given to the user as he or she concludes the video communication session would be preserved thereafter. Since it is contemplated for the visual conferencing services to be scheduled in advance, a record of people using such services would necessarily be kept prior thereto, however, it would only be kept for a limited period of time following each conference, possibly until the subscriber pays for the next subscription fee. Additional customer services could be made available to those using privacy booths through use of a connected telephone or pneumatic tube placing those in the privacy booth in direct communication with remotely located customer service personnel, such as opening an account, applying for a loan or mortgage, or paying bills. Walk-in service for visual conferencing would be possible, but not frequently requested since prior arrangements between remote subscribers would be necessary to insure that both were simultaneously present at a local control station for conduct of the conference. In the alternative, e-mail could be accessed at any time without a prior reservation and the email or control stations would maintain no paper record of the content of any e-mail transaction. The number of e-mail transmissions made by subscribers within a designated subscription period might be temporarily maintained in the subscriber database when needed for billing purposes, however even that information would be unnecessary if each e-mail transmission was paid for by the sending subscriber at the time it was sent.

Use of the e-mail stations by people more knowledgeable about computer operation can provide them with a diverse assortment of options, including the execution of many financial transactions such as but not limited to sending money to one or more other subscribers, paying bills, cashing checks, issuing paychecks, exchanging currencies, purchasing pre-paid telephone cards, purchasing pre-paid debit cards, purchasing money orders, purchasing transportation or entertainment tickets, purchasing goods and services such as groceries or gas, purchasing pre-paid software applications, purchasing bandwidth to send large files or for videoconferencing purposes, paying traffic tickets, and prepaying entertainment costs. As part of the application process for becoming a network subscriber, a digital photograph of the person is taken and entered into the computer database of the present invention, along with other identifying information about the subscriber, such as but not limited to social security number, full name, birth date, and/or full address and telephone number. Additional layers of security can also be employed in varying combinations as part of the application process, including but not limited to the taking of one or more fingerprints and establishing voice recognition patterns. Thereafter, a subscriber wanting to perform a variety of financial transactions through use of the present invention, whether positioned in front of an e-mail station having ATM capability at one of the network offices or in front of a stand-alone remote e-mail/ATM network accessing station, could do so by simply entering a discrete password and allowing the system to take a current digital photograph, fingerprint, and/or voice pattern sample and compare it to the digital photograph and other data already on file in its computer database. When money is transferred to another network subscriber, the recipient subscriber can choose to receive a message about the transfer via e-mail, pager, voice mail, or mobile phone, whereafter the recipient subscriber can proceed to the nearest network-accessing unit having automated teller machine capability to obtain all or part of the transferred money. Further, a video screen, microphone, camera, and speaker or speakers associated with a local e-mail station in a network office, or as part of a stand-alone remote email/ATM station, can further assist subscribers by providing them with full video motion customer service and alternatively provide the subscriber network with the opportunity for revenue generation through full video motion advertising.

The description herein provides preferred embodiments of the present invention but should not be construed as limiting the scope of its telecommunication system and method. For example, variations in the size of the privacy booth and the selection of electronic equipment available therein; the type of printers used for the local and remote e-mail stations; the type of access code used by the corresponding subscribers to send and receive e-mail messages; the order in which the visual communication, e-mail, money exchange, and information exchange takes place; the type of digital means used for subscriber identification; and the type of fax, scanning, and copying equipment selected for use, other than those shown and described herein, may be incorporated into the present invention. Thus the scope of the present invention should be determined by the appended claims and their legal equivalents, rather than being limited to the examples given.

DETAILED DESCRIPTION OF PREFERRED EMBODIMENTS

Figure 1:
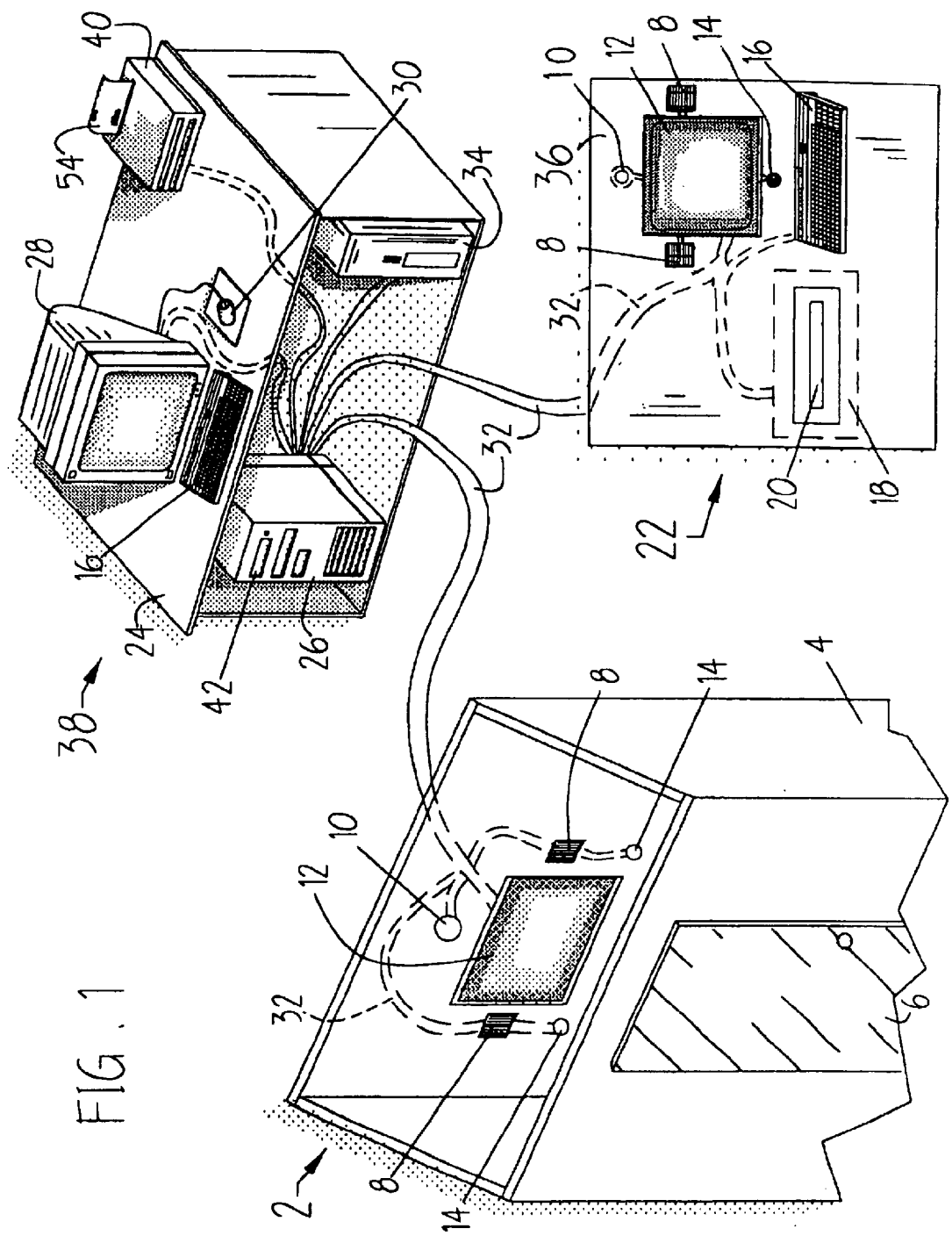
FIG. 1 is a not-to-scale perspective view of one embodiment of a privacy booth and local email station each connected to a central processing unit at a control station.

The present invention provides a computer-aided system and method for telecommunication that would allow people who may be unskilled in computer operation, those not having available to them the necessary personal computer equipment for real-time visual communication with remotely located family members and friends, and those skilled in computer operation with a personal computer connected to video-camera equipment to conduct a wide variety of telecommunication and financial transactions at a cost that is relatively low when compared to communication alternatives, in addition to providing an option for correspondents to promptly and securely transfer money from one to the other during such communication with instant transfer confirmation, and providing an option for capturing still and moving images of any visual communication participant for later use by one of their remote correspondents. An Internet website (not shown) would be provided for the communication link so that local telephone numbers can be used and long distance charges avoided, and so that other information (not shown) can be exchanged between subscribers such as the e-mail transfer of written messages and images, as well as classified ads, notices about items for sale, notices about upcoming events, descriptions of employment opportunities, and other similar types of information that can be directed toward targeted groups of recipient subscribers. In the preferred embodiment it is contemplated for visual and e-mail communication to be available on a subscription basis to family, friends, and other people remotely located from one another who would benefit from periodic visual communication so that once each subscriber is assigned an e-mail address and an access code, the correspondents' names, addresses, and codes are stored in a subscriber database for use by central processing unit 26 in identifying recipients of e-mail communications. Also, to avoid conflicts in use of privacy booths 2 by subscribers, it is contemplated for visual communications to be scheduled in advance. At the appointed time, each visual correspondent would be given an enclosed private room in which to conduct the visual communication, one embodiment of such a privacy booth 2 being shown in FIG. 1. At a minimum, it is contemplated for privacy booth 2 to be equipped with a high resolution monitor 12, a live video capture camera 10, audio speakers 8, at least one microphone 14, a writing surface 58, and at least one piece of furniture 44 that can comfortably seat one or more adults. A light, number 50 in FIG. 2, and or buzzer (not shown), along with a small window, number 46 in FIG. 2, could be installed through one of the walls of privacy booth 2 for signaling a skilled computer technician (not shown) of the need for his or her assistance, such as for the initialization of the capture of still or moving images of a remote correspondent for one or more local correspondents. Set up and activation of the visual communication equipment would be accomplished by a technician skilled in computer and electronic equipment operation through use of a central processing unit 26 at a control station 38. The amount of equipment control options within a privacy booth 2 or at an e-mail station 22, available to subscribers for adjusting the operation of the visual communication and e-mail communication equipment, would be limited to avoid subscriber mistake and resulting equipment malfunction. It is contemplated for the system of the present invention to comprise at least two control stations 38, at least one privacy booth 2 and at least one e-mail station 22 in the vicinity of each control station 38, as well as optional remote e-mail stations 62 and 82 each placed in monitored locations, such as hotels, restaurants, or grocery stores to deter theft and vandalism. For e-mail communication, subscribers would not have to know the recipient subscriber's e-mail address, only the name of the intended recipient subscriber or identification of the group of subscribers to which the e-mail communication is directed.

FIG. 1 shows a simplified representation of one embodiment of the minimum equipment needed for proper function of each control station 38 for the conduct of visual conferences between remote subscribers in a subscriber database (not shown) as well as the transfer of e-mail messages between the same subscribers. In FIG. 1 a privacy booth 2 and an e-mail station 22 are shown electronically connected to a control station 38 by data transfer cables 32. Where appropriate and feasible, wireless connection is also contemplated. Each privacy booth 2 which can be used to conduct both audio and visual communication between subscribers (not shown) in remote locations would have a door 6 that can be closed, soundproofing wall and ceiling materials (not shown) where needed to prevent people in adjoining privacy booths 2 from hearing conversations through the walls 4 of adjacent privacy booths 2, and a ceiling although a ceiling is not shown in FIG. 1 for illustrative purposes so that the interior of privacy booth 2 can be seen. FIG. 1 also shows the interior of privacy booth 2 having a high resolution monitor 12, a live video capture camera 10, two audio speakers 8, and a microphone 14 and connection thereof to central processing unit 26 by data transfer cables 32. It is contemplated that volume of speakers 8 and microphone 14, as well as the contrast and brightness of high resolution monitor 12, be controlled by a skilled technician (not shown) to avoid user mistake and reduce equipment malfunction.

It is also contemplated for the number of controls and subscriber options available at e-mail station 22 to also be minimal to avoid subscriber induced malfunction. FIG. 1 shows a preferred embodiment of a local e-mail station 22 having a keyboard 16 and a printer 18 hidden from subscriber view behind wall 36. FIG. 1 further shows e-mail station 22 having a display monitor 12, digital camera 10, microphone 14, and speakers 8 to assist in subscriber identity confirmation and customer service options. The arrangement of keyboard 16, printer 18, display monitor 12, digital camera 10, microphone 14, and speakers 8 can b different that that shown in FIG. 1, however, digital camera 10 and microphone 14 should be positioned for optimal use by a person situated in front of keyboard 16 and entering a personal code to access the subscriber network. Keyboard 16, printer 18, display monitor 12, digital camera 10, microphone 14, and speakers 8 are all connected to central processing unit 26 at control station 38 through data transfer cables 32. It is contemplated for subscribers' sole access to printer 18 to be through opening 20. Printer 18 maintenance, including the periodic addition of paper and replacement of imaging powder or ink cartridges, would be handled by one of the skilled technicians (not shown) working at control station 38. Also, access to controls for display monitor 12, digital camera 10, microphone 14, and speakers 8 would be limited to subscribers (not shown) using e-mail station 22 to minimize opportunities for malfunction. It is contemplated for the selection of electronic equipment at control station 38 to vary, but at a minimum to include a central processing unit 26, keyboard 16, and video recording equipment such as VCR 34. FIG. 1 shows control station 38 having a desk unit 24, with a keyboard 16, monitor 28, mouse 30, and printer/scanner/fax 40 positioned on top of desk unit 24. Positioned below monitor 28 FIG. 1 shows control station 38 having a central processing unit 26 with a drive unit 42 for removable information storage diskettes (not shown), VCR 34, and data transfer cables 32 connected between central processing unit 26 and monitor 28, printer/scanner/fax 40, privacy booth 2, and e-mail control station 22. Although not shown and optional according to user preference, it is contemplated for control station 38 to comprise individual printer, scanner, and fax devices instead of or in addition to printer/scanner/fax 40.

Figure 2:
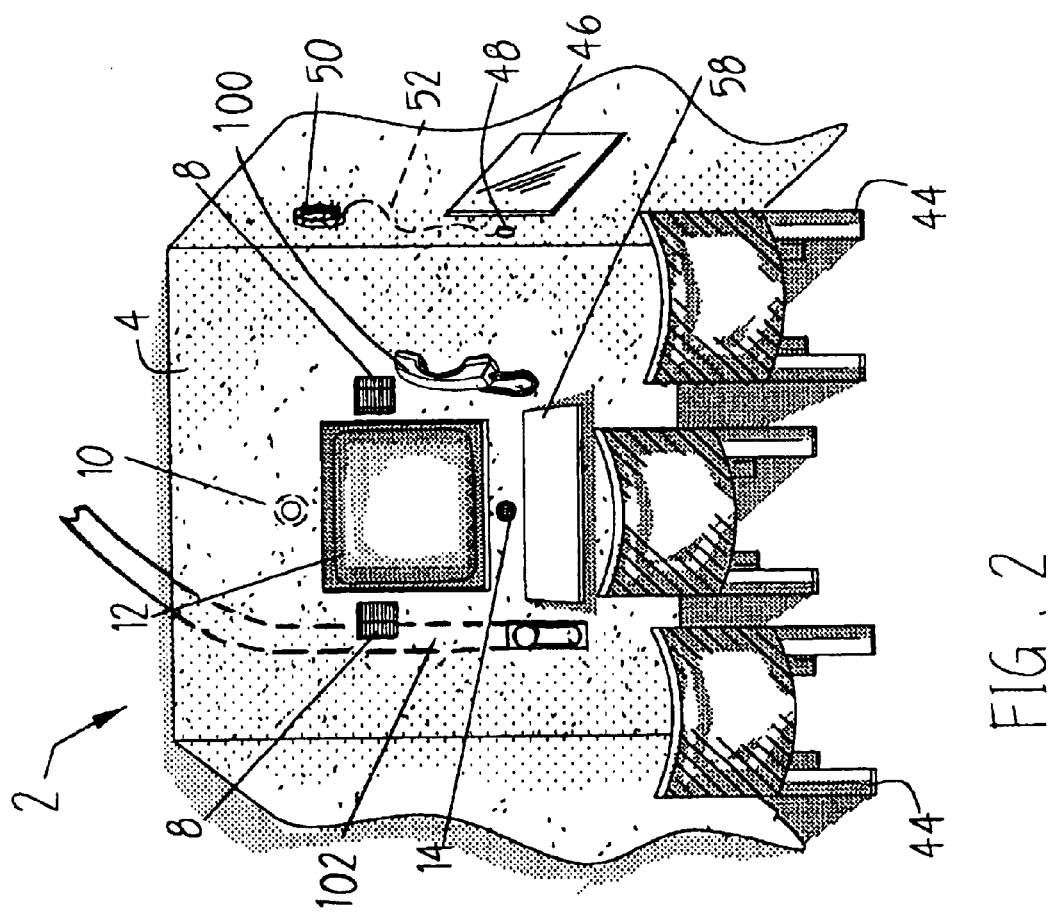
FIG. 2 is an enlarged front view of the inside of one embodiment of a privacy booth having a telephone and pneumatic tube for additional customer service options.

FIG. 2 shows a preferred embodiment of privacy booth 2 equipped with one high resolution monitor 12, one live video capture camera 10, two audio speakers 8, one microphone 14, one writing surface 58, a telephone 100 and pneumatic tube 102 for customer service use, and three pieces of furniture 44 that can comfortably seat subscribers (not shown). The number, size, and positioning of high resolution monitors 12, cameras 10, audio speakers 8, microphones 14, writing surfaces 58, telephones 100, pneumatic tubes 102, and pieces of furniture 44 relative to wall 4 are not critical. A light 50 and or buzzer 48, in addition to a small window 46 which optionally can have a sliding glass pane that can be opened by subscribers, could be used for signaling the skilled technician (not shown) of the need for his or her assistance, such as for the initialization of video capture of still or moving images of the remote correspondent for use by one of the local correspondents, or for the transfer of money. Writing surface 58 could be used for a recipient subscriber to sign a money receipt (not shown), or to temporarily positions papers or pictures that one subscriber wants to share with his or her visual correspondents. While pneumatic tube 102 would be used for transport of papers and small objects (not shown) to nearby technicians and customer service personnel, camera 10, microphone 14, and telephone 100 are used for telecommunication with more distant technicians and customer service personnel (not shown), as well as to maintain the privacy of select comments intended for only one of the people sharing a privacy booth. Immediately prior to a visual communication, equipment would be activated by a technician skilled in computer and electronic equipment operation through use of a central processing unit 26 at a control station 38. The amount of control options available to subscribers within a privacy booth 2, or at an e-mail station 22, would be limited to avoid subscriber mistake and equipment malfunction. Although not shown, privacy booth 2 could also be equipped with a keyboard 16 so that anyone in a privacy booth 2 and having computer skills could also conduct one or more financial transactions independently from the technicians at control station 38, including but not limited to the transfer of money, purchase of sports and entertainment tickets, and the purchase of tickets needed for travel.

Figure 3:
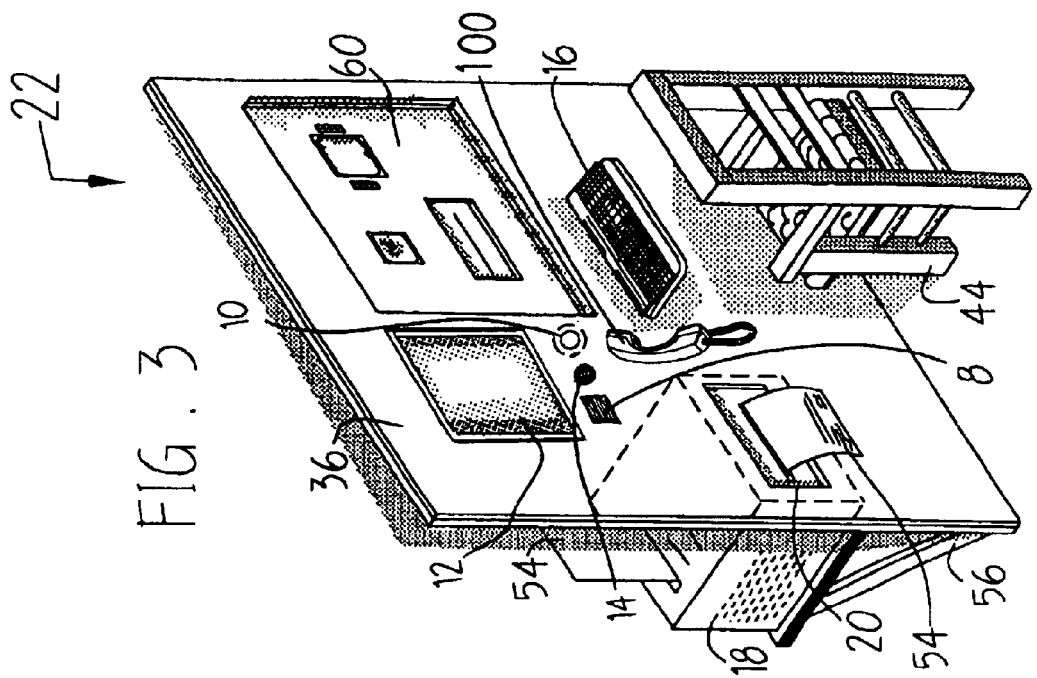
FIG. 3 is an enlarged perspective view of a first embodiment of a local e-mail station having ATM capability through which pre-recorded written messages can be sent and received, and through which financial transactions can be conducted.

FIG. 3 shows a preferred embodiment of an e-mail station 22 having keyboard 16, a piece of furniture 44 in the form of a chair positioned in front of keyboard 16, a printer 18 hidden from view of a user (not shown) but accessible through an opening 20 in wall 36 with paper 54 containing an e-mail message or a statement identifying the lack of e-mail messages extending through opening 20. FIG. 3 further shows a monitor 12, one digital camera 10, an audio speaker 8, one microphone 14, a telephone 100 and an optional automated teller machine 60. The number, size, and positioning of monitors 12, cameras 10, audio speakers 8, microphones 14, telephones 100, and pieces of furniture 44 relative to wall 36 are not critical. FIG. 3 also shows printer 18 sitting upon a supporting surface 56 behind wall 36. It is not critical whether supporting surface 56 is attached to wall 36 or separate from wall 36, and long as supporting surface 56 is sufficiently large and sturdy to permit printer 18 to properly and safely function without undue risk of falling therefrom. It is also not critical whether supporting surface 56 is smaller than, the same size as, or larger than the footprint of printer 18, however, it is not contemplated for supporting surface 56 to have an unduly large perimeter dimension. In the preferred embodiment e-mail station 22 would allow subscribers (not shown) to access messages sent to their assigned e-mail address and give them automatic printed copies of the messages received once they have typed their e-mail address, their unique access code, or both, on keyboard 16. If no messages had been received in the interim since the last time the subscriber checked his or her e-mail address, it is contemplated that the central processing unit 26 shown in FIG. 1 would direct printer 18 to print a statement on paper 54 identifying the lack of messages for the subscriber. FIG. 3 also shows e-mail station 22 having an optional automated teller machine 60 so that people wanting to pay for the cost of sending e-mail messages, to have money to send to a visual correspondent, or to have money to pay for off-site purchases would have the necessary funds available to do so. To exchange money through the website during a visual communication using monitor 12 in the preferred embodiment of the present invention, the two visual correspondents (not shown) would decide on an amount to be transferred. Then the donating correspondent while in front of the camera 10 in his or her privacy booth 2 would hand the designated amount of money to a local technician present in the donor's privacy booth 2 who is also positioned in front of camera 10 so as to be visible to both the remote correspondent and a remote technician in the recipient correspondent's privacy booth 2. At the recipient subscriber's location and in front of his or her camera 10, the recipient would sign documentation (not shown) confirming his or her identity as well as receipt of the identified money transfer amount. A technician at the recipient's location would then on camera 10 give the recipient the identified amount of money. The monetary exchange would be immediate and the donor would have real-time confirmation that the money transfer had been made. In the alternative or if the identified money transfer amount is large, so as not to make the recipient's control station 38 a target of theft or vandalism, the technician at the recipient's location could either give the recipient a check or bank voucher. Should a bank voucher be used, the recipient's technician would have made prior arrangements with a bank in the vicinity of control station 38 to allow money transfer to recipient subscribers. Then immediately after money transfer, the recipient's local technician would capture the recipient's image on camera 10 and through central processing unit 26 send the recipient subscriber's image to the bank so that only a person looking like the recipient and producing a bank voucher with a serial number and in the amount identified in the communication received by the bank's computer or fax machine would be able to retrieve the transferred money amount. With the bank having a clear and detailed picture of the recipient, it is contemplated that the opportunity for someone to obtain the transferred money by fraud would be greatly reduced. Should either of the correspondents during a visual communication desire an up-to-date still or moving picture of remote correspondent, the technician at the location of the correspondent desiring the image can be requested to activate a video-recording device at any designated time during the visual communication and after the conclusion of the visual communication provide the finished still and/or moving image or images to the correspondent before he or she departs the premises. The image preservation, as well as all communication, would be accomplished through computer software programming and to insure privacy for the correspondents, no record of the communication other than the copy given to the correspondent as he or she concludes the video communication session would be preserved thereafter. The same system of money transfer would be available for use with e-mail station 22, although privacy would not be as great as in a privacy booth 2. However, in addition, skilled computer operators could also conduct a wide variety of financial transactions through the subscriber network using keyboard 16, to include paying bills, making payroll payments to employees, making purchases of goods and services, immediate transfer of money to an individual recipient whereby that recipient is given a preselected form of message informing the recipient that money is available for his or her use, the transferred amount, where the awaiting funds are located, the code needed to access the funds, and the form in which the funds are available.

Figure 4:
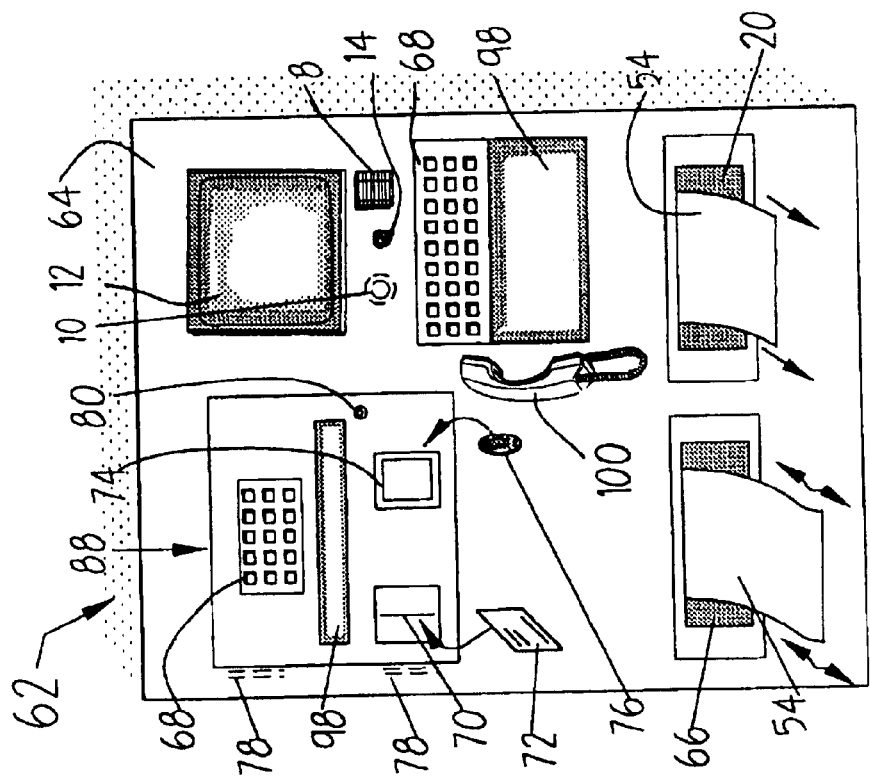
FIG. 4 is a front view of a first embodiment of a remote e-mail/ATM station through which pre-recorded written messages can be sent and received, and through which financial transactions can be conducted, the remote e-mail/ATM station being configured as a wall-mounted unit for a location remote from the control station.
Figure 6A:
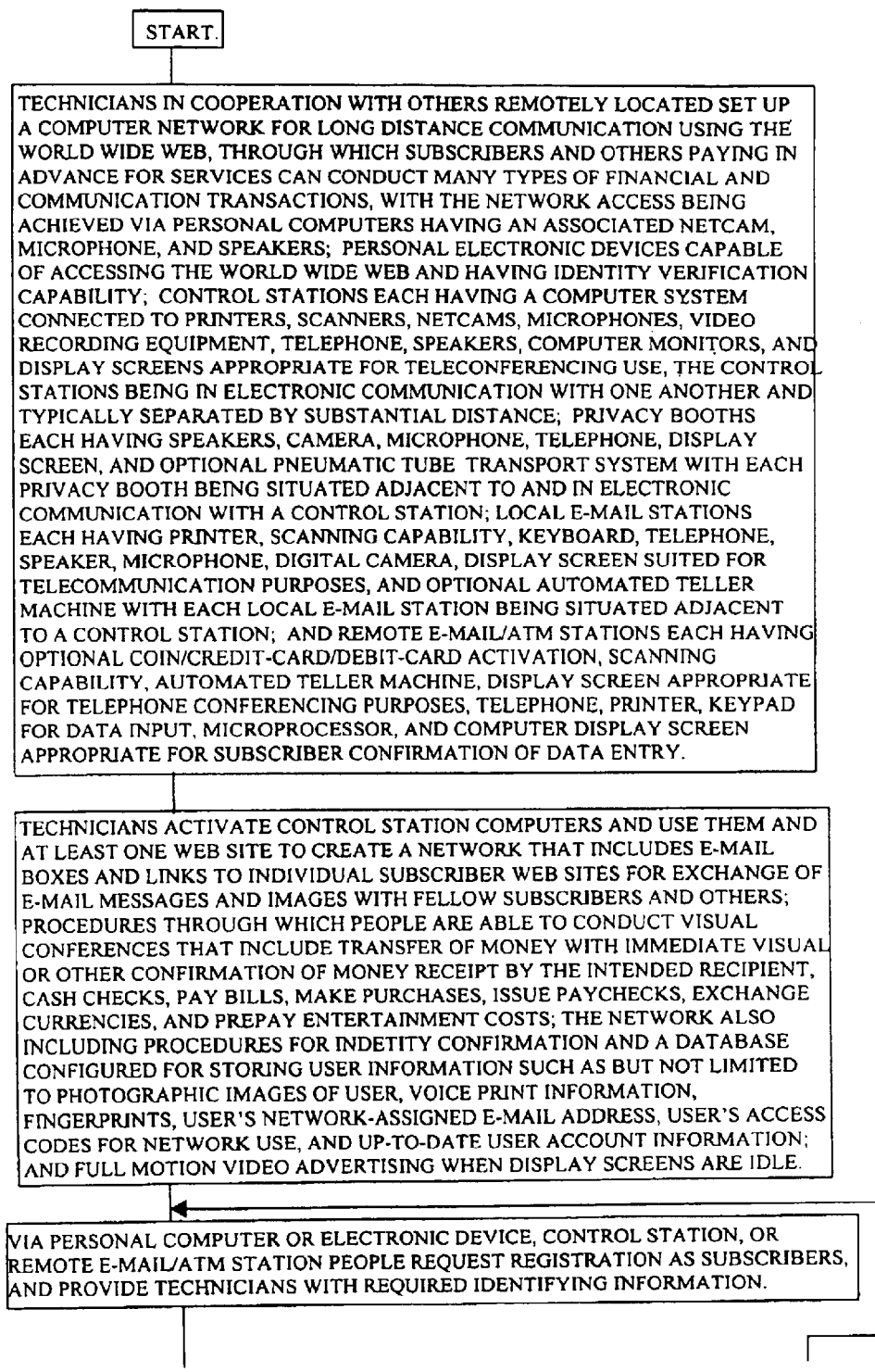
FIG. 6 is a flow chart of the steps involved in one preferred embodiment of the method of the present invention.
Figure 6B:
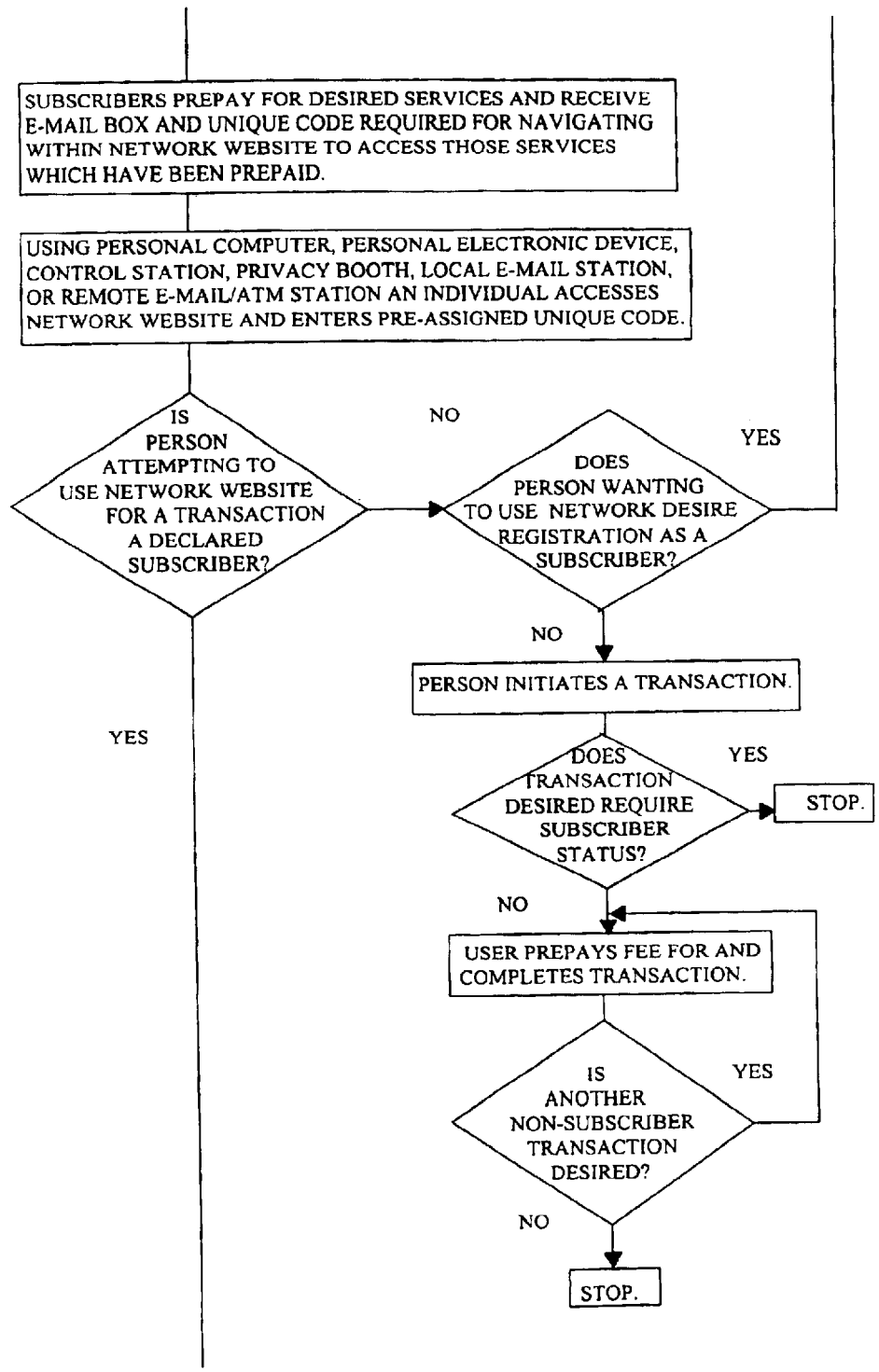
Figure 6C:
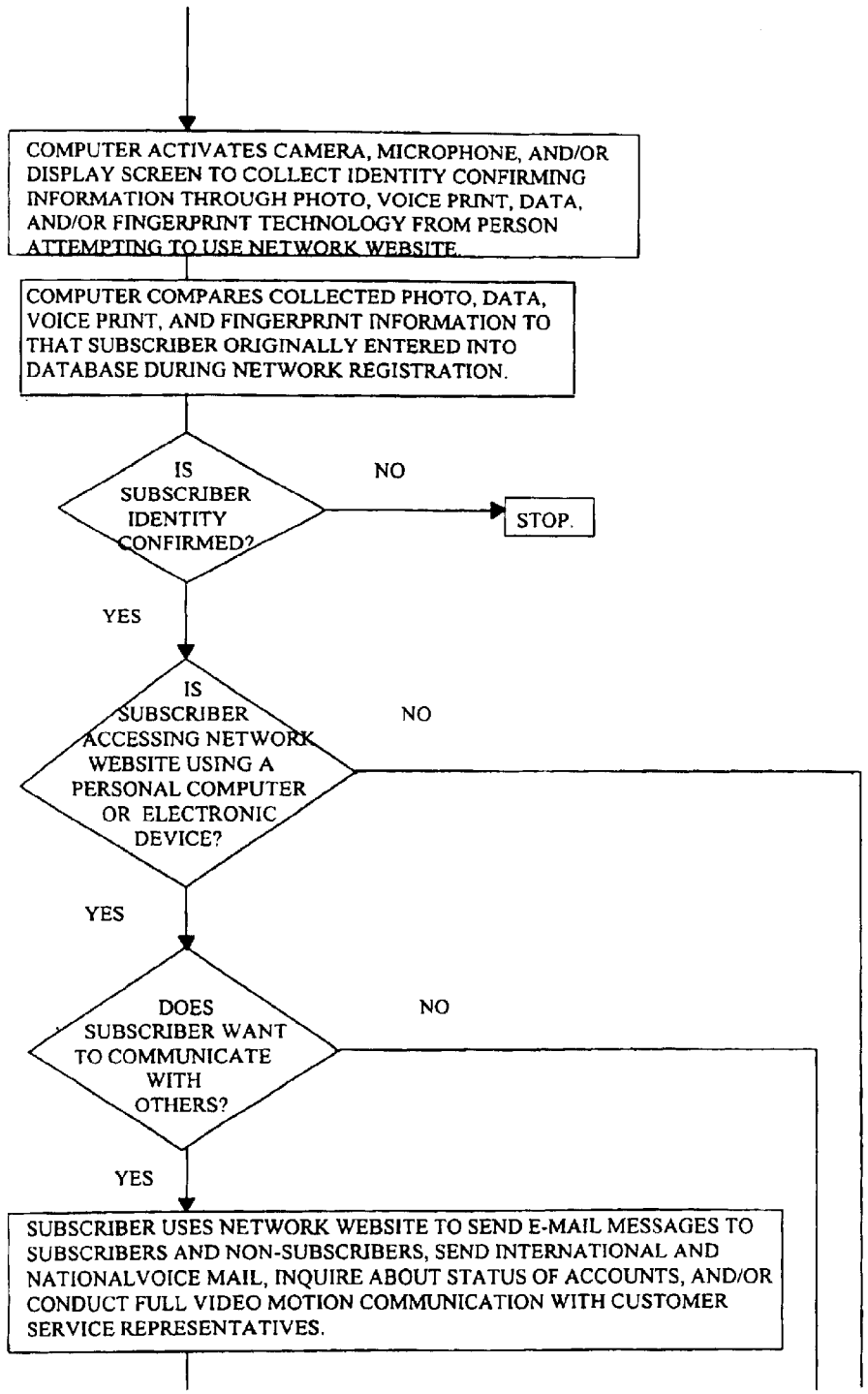
Figure 6D:
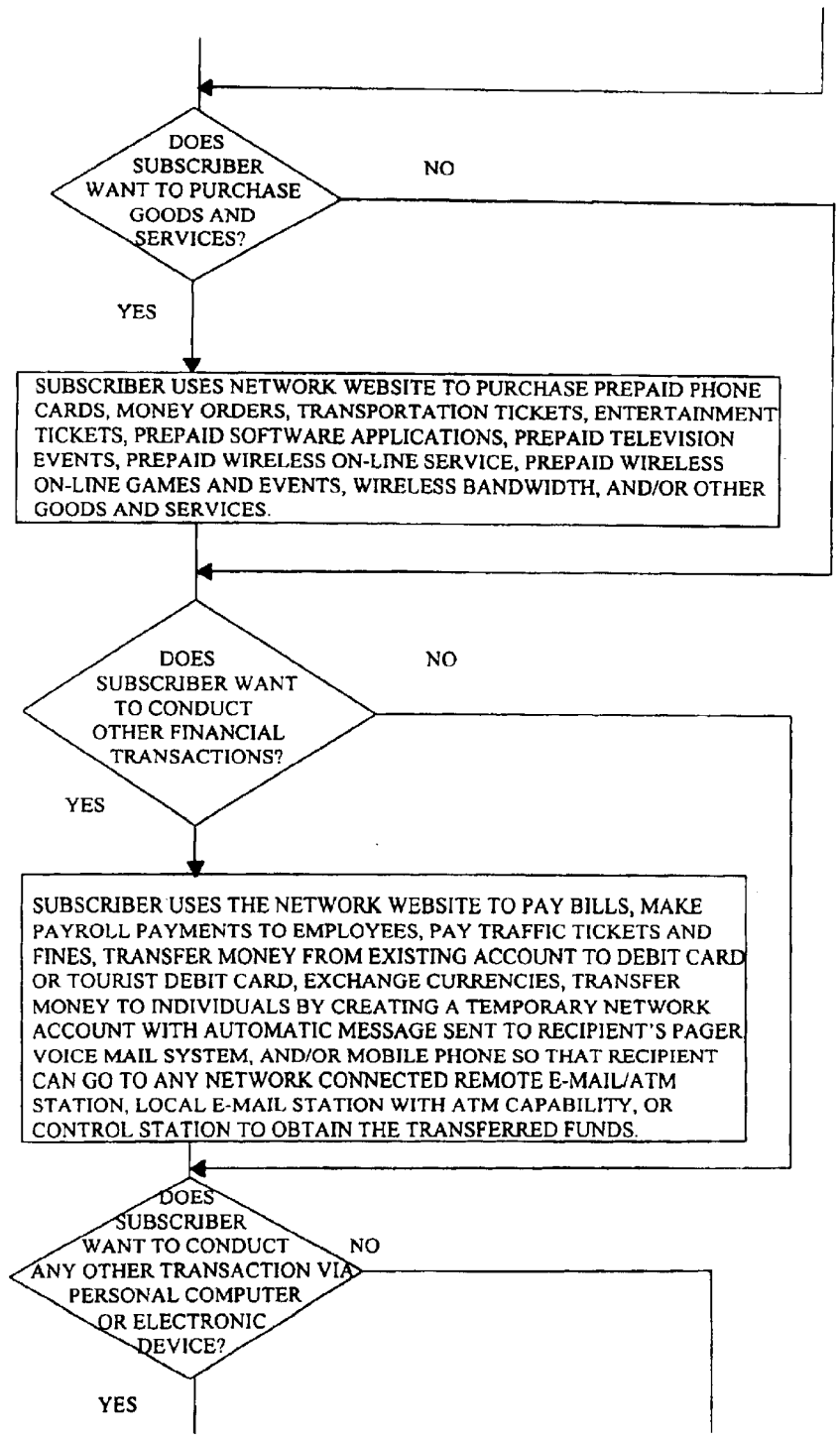
Figure 6E:
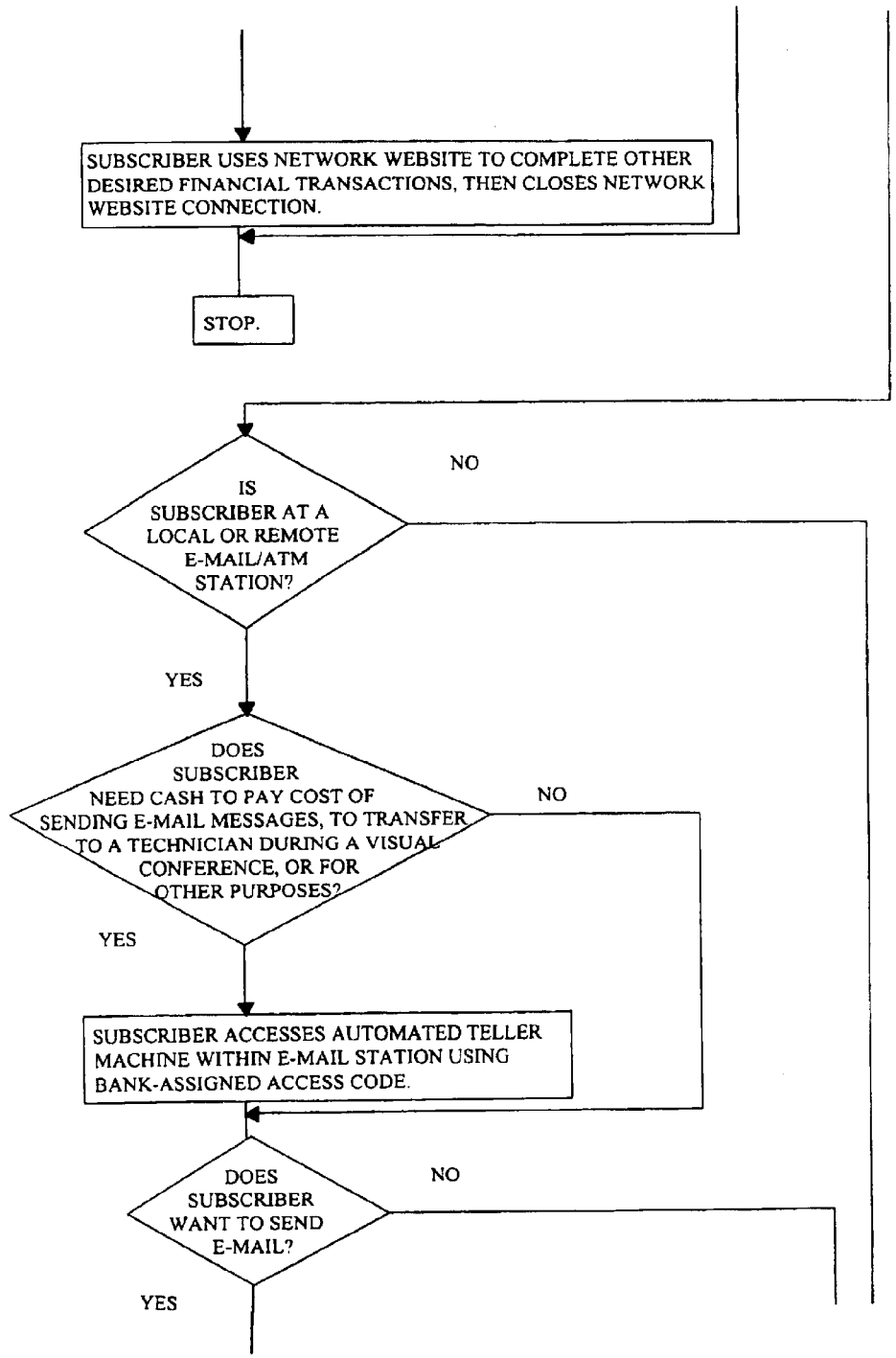
Figure 6F:
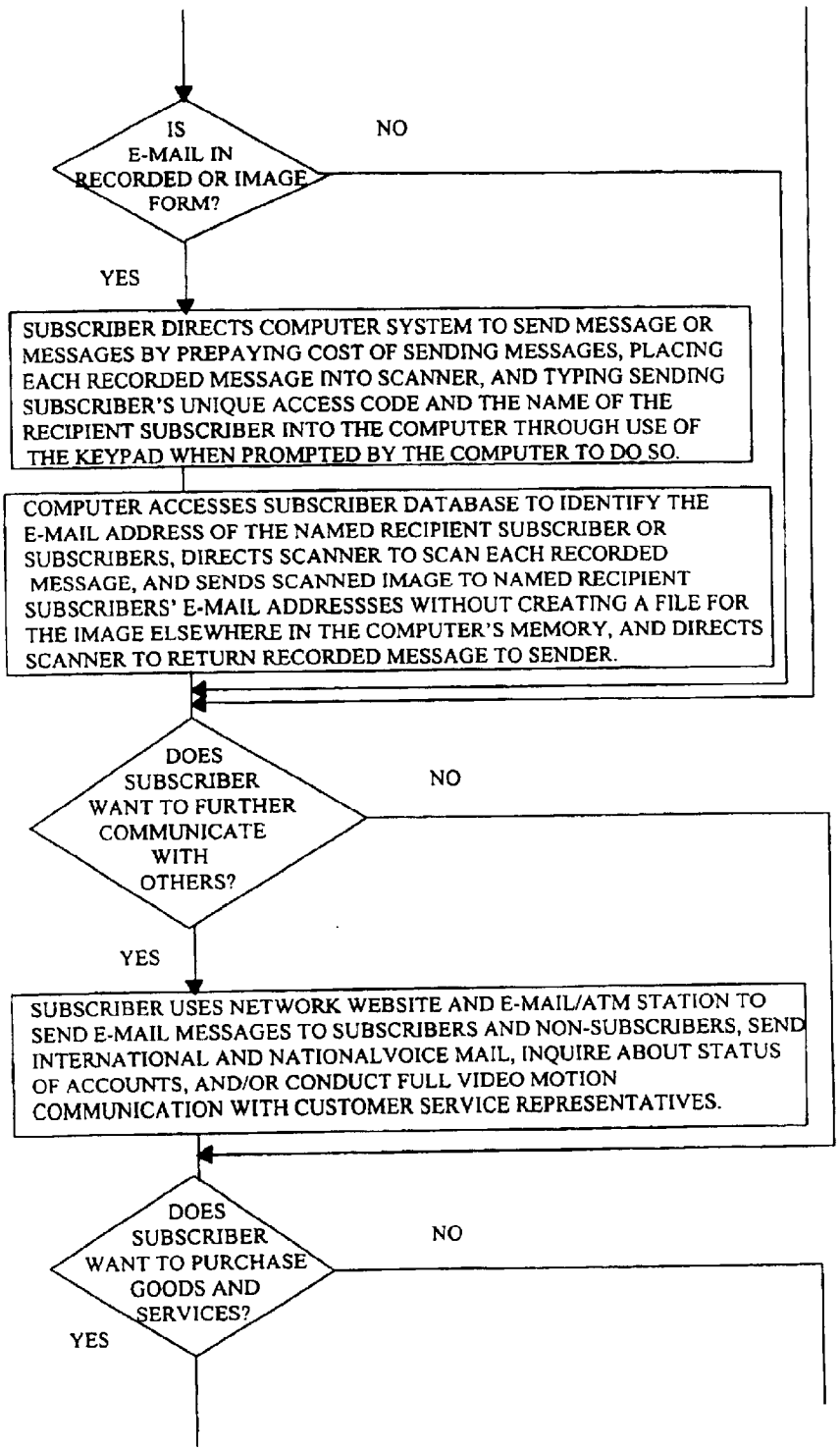
Figure 6G:
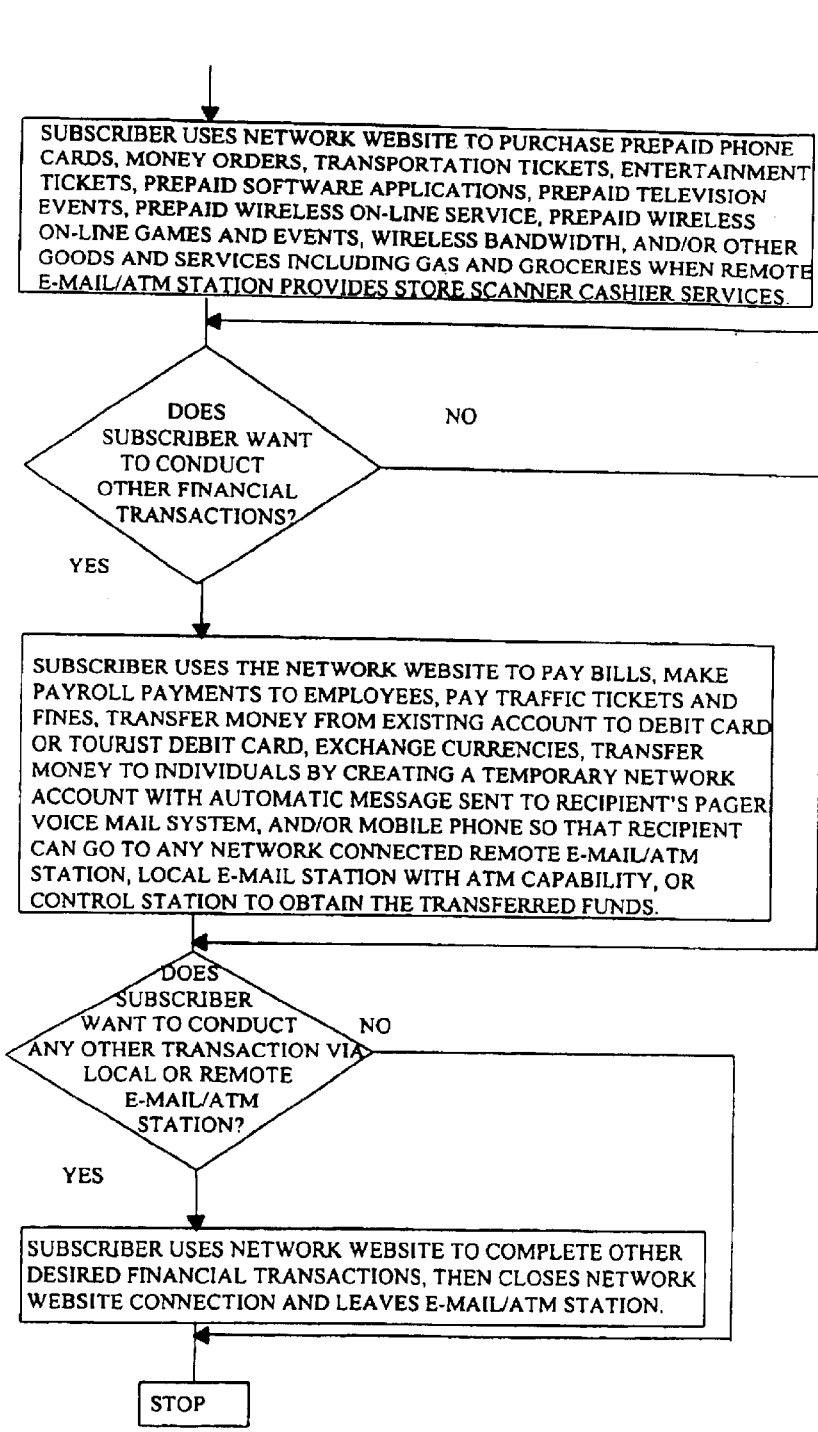
Figure 6H:
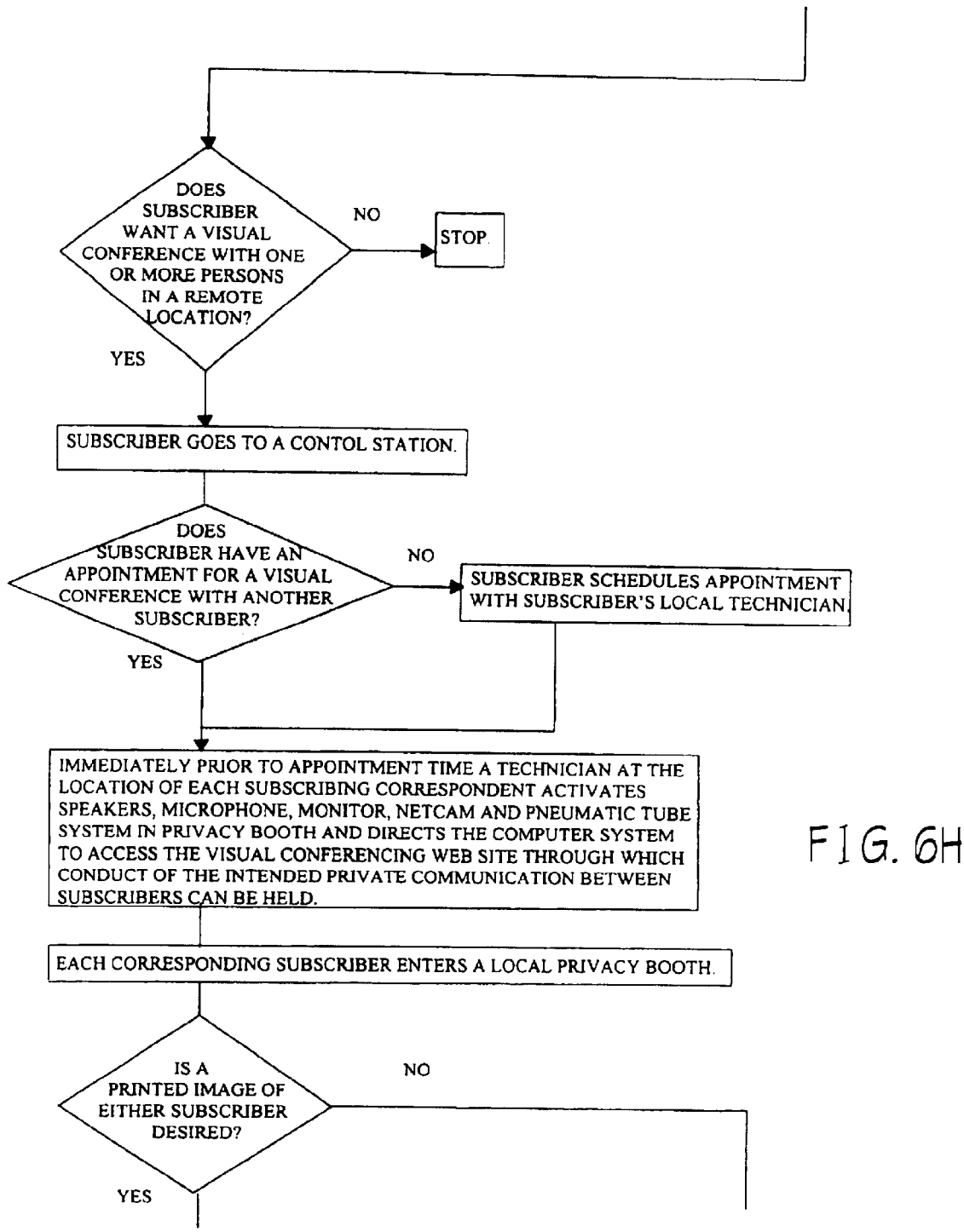
Figure 61:
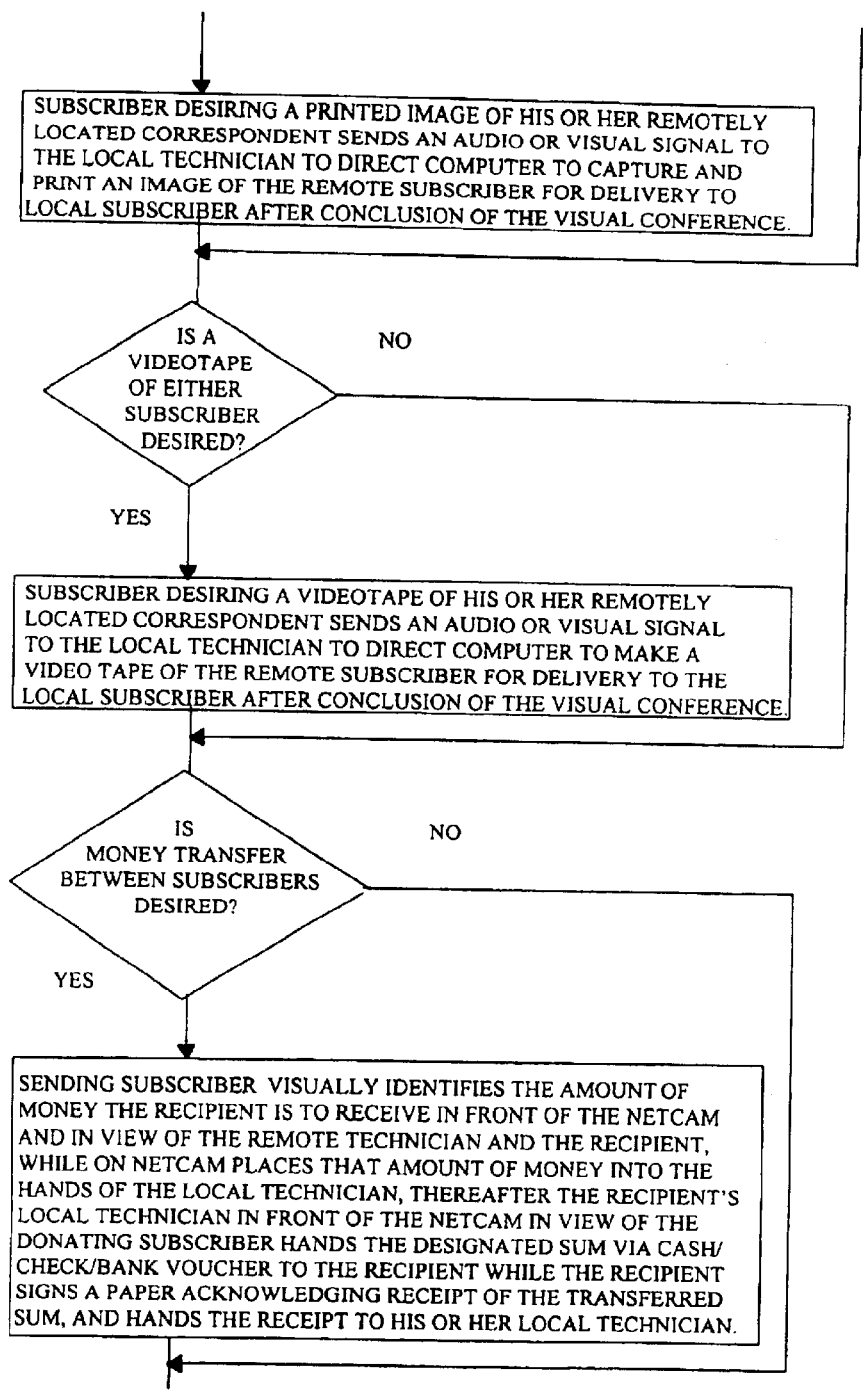
Figure 6J:
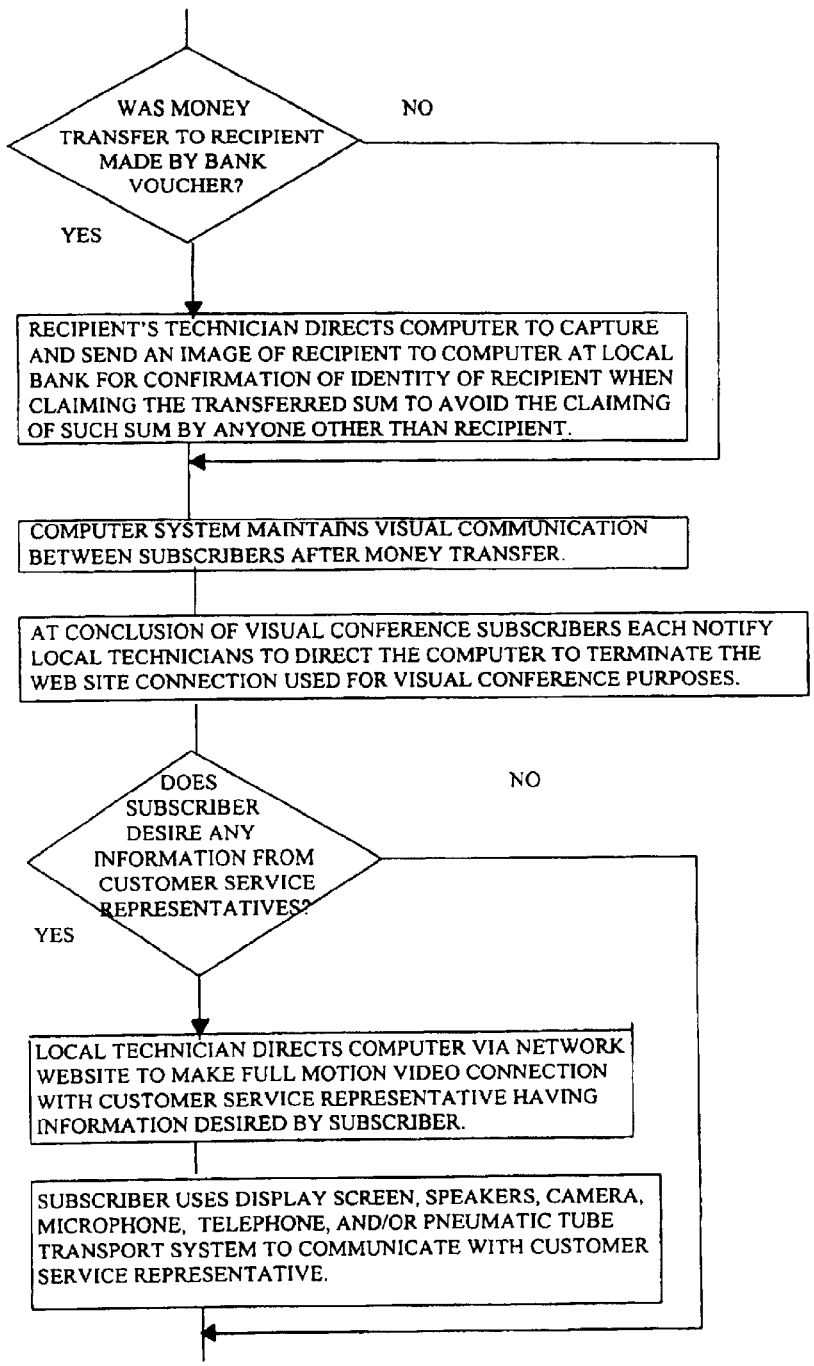
Figure 6K:
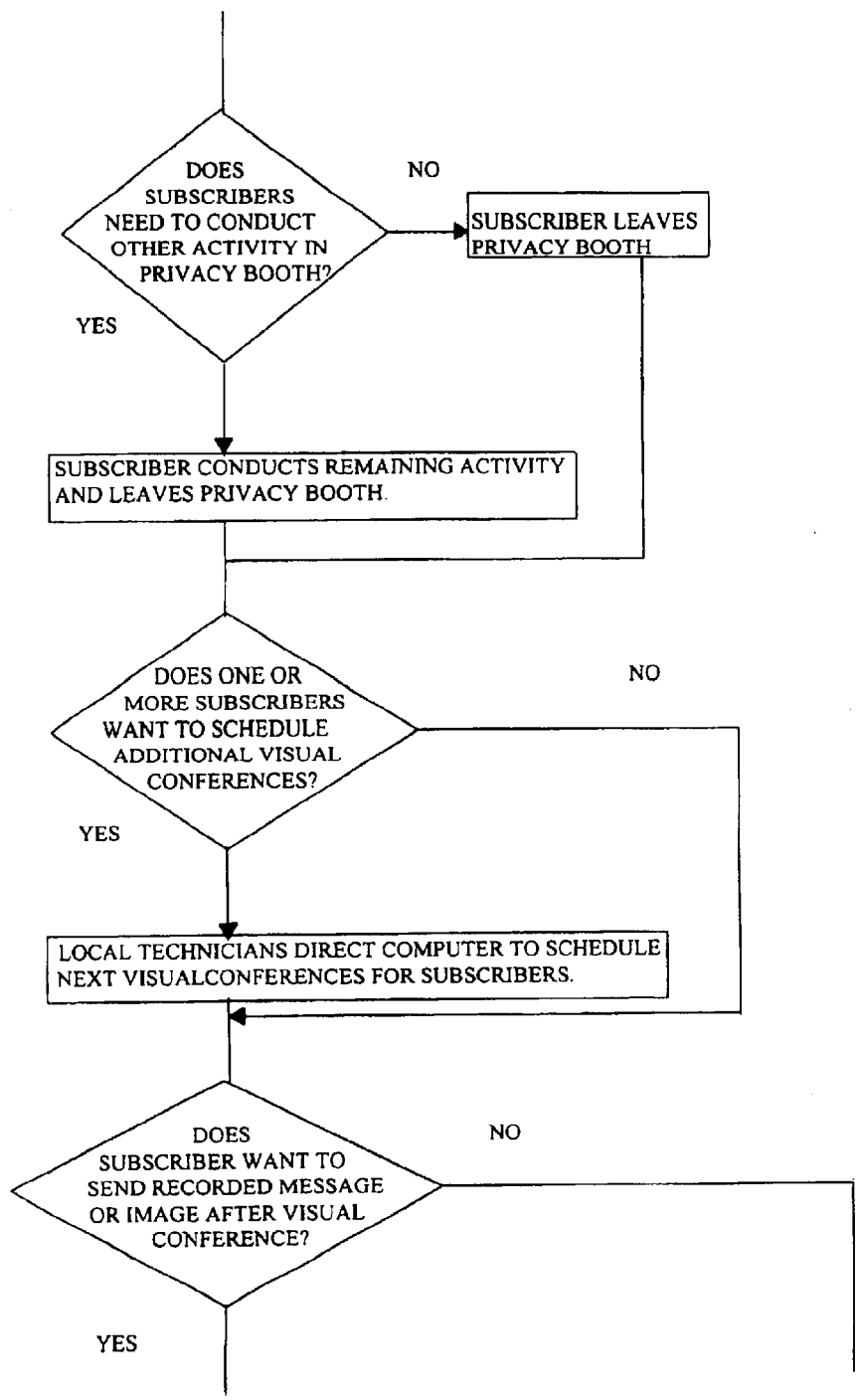
Figure 6L:
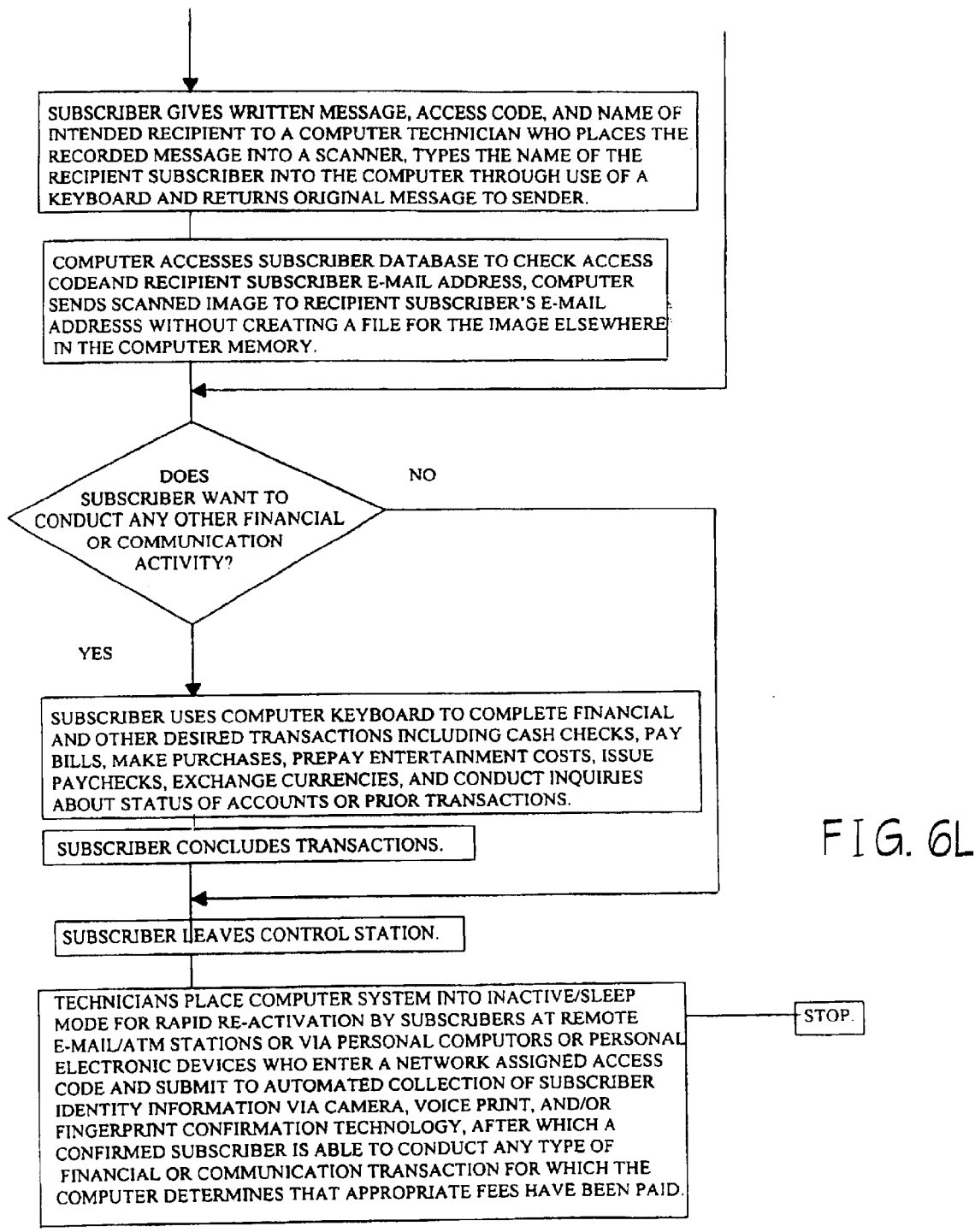

FIG. 4 shows a preferred embodiment of a wall-mounted e-mail station 62 having two keypads 68 each positioned adjacent to a different display screen 98, a printer opening 20 through which a user could receive e-mail messages on paper 54, and a separate scanner opening 66 through which a user could introduce written message or images on paper 54 for scanning and transfer to another subscriber e-mail address in the subscriber database (not shown). Depending upon the scanner 86 used, two scanner openings 66 might be required. E-mail station 62 could be used as a substitute for the e-mail station 22 shown in FIG. 3, simultaneously with e-mail station 22 so that more than one subscriber at a time can access individual e-mail messages, or as a remote e-mail station placed in a business location such as a hotel, restaurant, or grocery store (not shown). It is contemplated for either paired keypad 68 and display 98 in FIG. 4 to be used by the sending subscriber to type his or her assigned access code and the name of the intended subscriber recipient. Should the transferred message be a classified ad or sale notice intended for all subscribers in the subscriber database or a pre-selected group of subscribers in the subscriber database, the sending subscriber upon prompting by display 98 would simply type the word "all", "family", "sisters", "all women", "all men", or some other pre-arranged group term and the computer would be programmed to automatically send the message to all such recipient subscribers. Since it is contemplated for e-mail station 62 shown in FIG. 4 to optionally be placed in remote locations unsupervised by skilled technicians except for the regular visits by maintenance personnel, the embodiment of e-mail station 62 shown in FIG. 4 also has an on-site payment unit, shown in FIG. 5 as number 88, configured for accepting coins 76 and credit/debit cards 72 when the subscriber is required to pay immediately prior to transmission for each message that he or she desires to send to others in the subscriber database. FIG. 4 shows on-site payment unit 88 having a keypad 68 for typing information such as a bank-assigned access code and the number of messages to be sent, a display 98 for communicating with the sending subscriber, a coin vault 74, a credit/debit card slot 70, hinges 78 for allowing the front cover of on-site payment unit 88 to be opened for retrieval of coins 76, and a lock 80 to prevent unauthorized retrieval of coins 76. Display monitor 12, digital camera 10, microphone 14, speaker 8, and telephone 100 can be used for subscriber identity confirmation as well as customer service options. The positioning of monitor 12, digital camera 10, microphone 14, speaker 8, telephone 100, scanner opening 66, printer opening 20, on-site payment unit 88, keypad 68, and display 98 are not critical to wall-mounted e-mail station 62 and it is contemplated for wall-mounted e-mail station 62 to have varying arrangements of subscriber communication devices as well as differing embodiments such as one in which a combined scanner/printer device such as scanner/printer/fax 40 is used to both send e-mail messages and receive them through a single aperture similar to either scanner opening 66 or printer opening 20. Another possible embodiment variation of wall-mounted e-mail station 62 would include a slot for receiving currency in addition to or in place of coins, and/or an opening through which a payment receipt can be given to the sending subscriber, such as receipt dispensing slot 96 in FIG. 5. Although not shown in FIG. 4, but similar to that shown in FIG. 5, it would be critical for wall-mounted e-mail station 62 to have an electrical connection to a remote power source, a telephone access connection, and a central processing unit with a modem for accessing the Internet website and information in the subscriber database.

Figure 5:
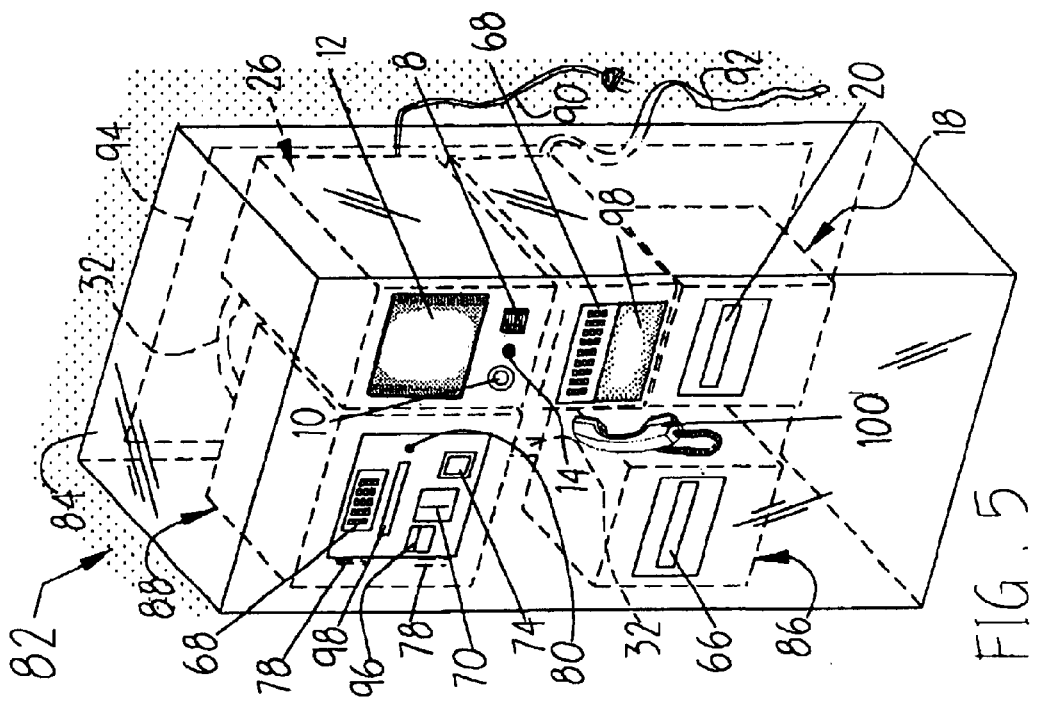
FIG. 5 is a perspective view of a second embodiment of a remote e-mail/ATM station through which pre-recorded written messages can be sent and received, and through which financial transactions can be conducted, the second embodiment being configured as an independent, free-standing unit for a location remote from the control station.

FIG. 5 shows a preferred embodiment of a stand-alone e-mail station 82 having two keypads 68 each positioned adjacent to a different display screen 98, a printer opening 20 through which a user could receive e-mail messages, and a separate scanner opening 66 through which a user could introduce written message or images for scanning and transfer to another subscriber e-mail address in the subscriber database. Keypads 68, displays 98, printer opening 20, and scanner opening 66 are all shown in FIG. 5 to be connected through the same wall of a cabinet 84. In the alternative if the surroundings of stand-alone e-mail station 82 permit, printer opening 20 could be positioned through a different wall of cabinet 84 so that a subsequent subscriber could access one of the keypads 68 while the previous subscriber's e-mail messages are being printed. FIG. 5 shows a scanner 86 and a printer 18 positioned respectively behind scanner opening 66 and printer opening 20, although in actual use they each would be hidden from the view of a sending subscriber standing in front of e-mail station 82. Although not critical, for ease of use it is contemplated for scanner opening 66 and printer opening 20 to be positioned beneath keypads 68 and associated displays 98. FIG. 5 also shows a central processing unit 26 positioned behind the front wall of cabinet 84 and adjacent to onsite payment unit 88, as well as data transfer cable connections 32 between central processing unit 26 and on-site payment unit 88, scanner 86, and printer 18, in addition to a telephone line 92 and an electric cord 90 being connected to central processing unit 26 and extending through cabinet 84. Although not shown in FIG. 5 it is contemplated for central processing unit 26 to have a modem for accessing the Internet website and information in the subscriber database (not shown). FIG. 5 further shows stand-alone e-mail station 82 having a display monitor 12, digital camera 10, microphone 14, speaker 8, and telephone 100 that can be used for subscriber identity confirmation as well as customer service options. The configuration of cabinet 84 is not critical, and not limited to the rectangular configuration shown in FIG. 5. It is contemplated for stand-alone e-mail station 82 to be employed primarily for use in an off-site location remote from control station 38, however, stand-alone e-mail station 82 could also be used as a substitute for the e-mail station 22 shown in FIG. 3, or wall-mounted e-mail station 62 shown in FIG. 4, or simultaneously with either one so that more than one subscriber at a time can access individual e-mail messages. It is contemplated for the paired keypad 68 and display 98 in FIG. 5 to be used by the sending subscriber to type his or her assigned access code and the name of the intended subscriber recipient. Should the transferred message be a classified ad or sale notice intended for all subscribers in the subscriber database or a preselected group of subscribers in the subscriber database, the sending subscriber upon prompting by display 98 would type the name of the recipient subscriber or a pre-arranged group term identifying the pre-selected and the computer would be programmed to automatically and promptly send the message to all of the identified recipient subscribers. Since it is contemplated for stand-alone e-mail station 82 shown in FIG. 5 to optionally be placed in remote locations unsupervised by skilled technicians, the embodiment of standalone e-mail station 82 shown in FIG. 5 also has an on-site payment unit 88 configured for accepting coins 76 and credit/debit cards 72 when the subscriber is required to pay immediately prior to transmission for each message that he or she desires to send to others in the subscriber database. FIG. 5 shows on-site payment unit 88 having a keypad 68 for typing information such as a bank-assigned access code and the number of messages to be sent, a display 98 for communicating with the sending subscriber, a coin vault 74, a credit/debit card slot 70, a subscriber receipt dispensing slot 96, hinges 78 for allowing the front cover of onsite payment unit 88 to be opened for retrieval of coins 76, and a lock 80 to prevent unauthorized retrieval of coins 76. FIG. 5 further shows a rear door 94 in cabinet 84 for emergency access to and routine maintenance of on-site payment unit 88, central processing unit 26, scanner 86, and printer 18. Although not shown and not critical to stand-alone e-mail station 82, it is considered within the scope of the present invention for cabinet 84 to have support feet, rollers, or wheels connected to its bottom surface for ease in moving cabinet 84 when necessary for maintenance technicians to gain access to rear door 94. The positioning of monitor 12, digital camera 10, microphone 14, speaker 8, telephone 100 scanner opening 66, printer opening 20, on-site payment unit 88, keypad 68, and display 98 are not critical to stand-alone e-mail station 82 and it is contemplated for stand-alone e-mail station 82 to have varying arrangements of subscriber communication devices as well as differing embodiments such as one in which a combined scanner/printer device such as scanner/printer/fax 40 is used to both send e-mail messages and receive them through a single aperture similar to scanner opening 66 or printer opening 20. Combining the scanner and printer functions into one device would reduce the cost of stand-alone e-mail station 82, however, it would also reduce its functionality in instances of malfunction. Having independent scanners 86 and printers 18 would allow each to continue to function when the other becomes inoperative, so that a sending subscriber could still transmit an e-mail message through scanner 86 even if printer 18 was not working, or vice versa. Another possible embodiment variation of stand-alone e-mail station 82 would include a slot for receiving currency in addition to or in place of coins. It is contemplated for stand-alone e-mail station 82 to be placed in supervised locations, such as in a hotel lobby, a grocery store, or a restaurant at a busy freeway exit with a high volume of business from travelers, or one located near an area attracting a high volume of foreign tourists or other visitors.

FIG. 6 shows the necessary and optional steps in one preferred embodiment of the present invention for the conduct of e-mail transmission and retrieval between database subscribers, a wide variety of financial functions, as well as visual conferencing between subscribers that includes capture of remote correspondent images and the secure transfer of money between visual correspondents. To use the present invention, technicians skilled in computer and electronic equipment operation, and each in a location remote from the other or other, would set up a central processing unit 26 and connect it to a printer/scanner/fax unit 40, a live video capture/digital camera such as camera 10, microphones 14, video recording equipment such as VCR 34, speakers 8, a high resolution monitor 12, an e-mail stations 22, 62, and/or 82 having optional coin/credit card/debit card activation, an optional automated teller machine 60, an optional scanner 86, a printer 18, keypad 68 for data input, and a display screen 98, the system also having on-line access to a website programmed to provide subscriber e-mail communication. After the technicians set up and make the visual and e-mail communication systems operational, they would use the central processing unit 26 and the card/debit card activation, an optional automated teller machine 60, an optional scanner 86, a printer 18, keypad 68 for data input, and a display screen 98, the system also having on-line access to a website programmed to provide subscriber e-mail communication. Privacy booths 2 with chairs 44, or other furniture comfortable for subscribers, would also be provided into which those in visual communication with others, including those conducting customer service interviews and/or transactions, could go to accomplish long distance communication out of sight and beyond the hearing capability of others. Optionally, for the convenience of subscribers, a telephone 100 and a pneumatic tube transfer system 102 can be added to each privacy booth 2 to facilitate customer service information and paperwork exchanges. After the technicians set up and make the visual and e-mail communication systems operational, they would use the central processing unit 26 and the website to create a database of subscribers who want to send written e-mail messages and pictorial images to other database subscribers, conduct financial transactions including money transfer as well as visual conferences with other subscribers, in addition to creating an e-mail address for each such subscriber, a web site for each subscriber for information display, and assigning each such subscriber a unique system access code. In addition, at registration identity confirming information is collected from the person wanting to be a subscriber, such as one or more digital photos, one or more fingerprints, a voice print, social security number, full name, full address, date of birth, and other confidential information that might be helpful to avoid future fraud or mistake, such as if the person has any siblings or other relatives with an identical or nearly identical appearance. All such information is stored in the network database and maintained for comparison to similar information collected when the subscriber initially accesses the network website to conduct a transaction. Advertising would be displayed on idle screens 12 in privacy booths 2, in local and remote e-mail and e-mail/ATM stations 22, 62, and 82, as well as on personal computers and other electronic devices (not shown) used to access the network website from a home, office, hotel, or other site not a direct part of the network infrastructure. Once a subscriber decides that he or she would like to communicate with another subscriber, the subscriber would decide if a visual conference, an e-mail transmission, e-mail receipt, or a combination thereof is desired, and if he or she would like money to be a part of the communication. If only e-mail transmission and receipt is desired and the subscriber does not want help from a technician at a control station 38, the sending subscriber could choose his or her own personal computer or other electronic device capable of making an on-line connection, or approach a remote e-mail station, such as wall-mounted e-mail station 62 or stand-alone e-mail station 82. If only e-mail receipt is desired, e-mail station 22 could be used. The first step in the transaction would be for the subscriber to enter his or her unique assigned network access code into the computer. While the declared subscriber is entering this code, the computer collects current subscriber identifying information and compares it to that initially collected during registration, or updated replacement information in the network database. If the current subscriber identifying information matches that on record in the database, the declared subscriber may access the network website to conduct desired transactions. Payment for the transactions must be made in advance, either by payment of a periodic subscription fee, or a per transaction payment must be made via cash, credit, debit, or similar card immediately prior to conducting the transaction. On-site payment for each transmitted message could be paid at control station 38, e-mail station 62, or e-mail station 82, or through a debit account with the transaction being controlled by the subscriber via his or her own personal computer (not shown). In the alternative, the recurring subscription fee paid by or on behalf of each subscriber could include a pre-selected number of e-mail transmissions per payment period that would not require the payment of a per transaction fee. Once that number of e-mail transmissions is exceeded, central processing unit 26 would indicate to the sending subscriber that on-site payment is required until the start of the next subscription period. Should the sending subscriber need currency to send messages to other subscribers or later transfer money during a visual conference, the sending subscriber could access an automated teller machine with bank-assigned access codes if one were provided in the embodiment of the e-mail station he or she had approached. After obtaining the necessary payment, if needed, the sending subscriber would direct central processing unit 26 to send a message to another person in the subscriber database by prepaying cost of sending each message, either as part of his or her prepaid subscription fee or on-site payment. Once transmission payment verification is concluded, the sending subscriber would place a recorded message into scanner 86, or a scanner connected to a personal computer or other personal electronic device (not shown), and using keypad 68 type the sending subscriber's unique access code as well as the name of the intended recipient subscriber, or a pre-selected term for a group of intended recipient subscribers, when prompted to do so by display 98. In the alternative, any subscriber having computer skills could compose an e-mail message using a keyboard 16 or keypad 68, and then send it by following the procedure prompts on monitor 12 or display screen 98. Central processing unit 26 would then access the subscriber database to identify the e-mail address of the named recipient subscriber or subscribers, then direct scanner 86 to scan the recorded message inserted through scanner opening 66, and send the scanned image to the identified e-mail addresses without creating a permanent file for the scanner image in the computer's memory, after which central processing unit 26 would direct scanner 86 to return the inserted recorded message to the sending subscriber. E-mail messages from subscribers to non-subscribers could be send by those skilled in computer operation using the network website in the customary manner from personal computers, personal electronic devices, local e-mail stations 22, and remote e-mail/ATM stations 62 or 82. If the sending subscriber subsequently checked his or her received e-mail messages and found a message requiring an immediate response, the sending subscriber could also send additional messages in a like manner. However, if the sending subscriber would also like to conduct a visual conference with another person or group of people in the subscriber database, the sending subscriber would then have to approach a control station 38.

Preferably appointments for visual conferences would be set up in advance, or on a recurring basis, but it is also contemplated for visual conferences to be held on short notice where both subscribing correspondents come to control stations 38 remote from one another at a time period during which there is no conflicting subscriber use of privacy booth 2. Immediately prior to the appointed time, a technician at the location of each subscribing correspondent would activate and confirm the optimum operation of speakers 8, microphones 14, high resolution monitors 12, telephone 100, pneumatic tube transfer system 102, and cameras 10 in the privacy booth 2 intended for use, and then direct central processing unit 26 to access the visual conferencing website through which conduct of the intended private communication between people in the subscriber database can be held. After everything is confirmed to be in good working order, each corresponding subscriber would enter a local privacy booth 2. If a still image or moving images of the remote correspondent is desired during the visual conference, or money transfer between correspondents contemplated, each correspondent should so notify his or her local technician prior to entering privacy booth 2. A subscriber desiring a printed image or images of his or her remotely located correspondent would send an audio or visual signal to the local technician to direct central processing unit 26 to direct the capture and printing of an image of the remote subscriber at designated times. The images would be presented to the local subscriber after conclusion of the visual conference. The only images made would be given to the correspondent and it is contemplated that no copy or computer file of the image would be retained by control station 38. If in addition to receiving a copy of a captured image of the remote correspondent, the subscriber would like to send a copy of the captured image by e-mail to another person in the subscriber database, such as a sister, uncle, cousin, or friend, the subscriber would so notify the local technician of the names of the intended recipients and the local technician would also direct central processing unit 26 to send the captured image or images to each of the intended recipients without creating a file of the captured images in the computer's memory. Should a subscriber desire a videotape of his or her remotely located correspondent during the visual conference, the subscriber desiring the videotape could also send an audio or visual signal to the local technician for the local technician to direct central processing unit 26 to initiate image capture in videotape form of the remote correspondent for delivery to the local subscriber after conclusion of the visual conference, before the subscriber leaves control station 38. Privacy booths 2 can also be used for communication with customer service representatives, so that personal financial and other information revealed to them to obtain loans, open accounts, purchase insurance, or purchase stocks, and the like, will not be overheard by others. If the customer service personnel are in the same or a nearby building, pneumatic tube system 102 can be used by the subscriber and the customer service personnel to exchange written information.

Should money transfer be desired between correspondents, the sending subscriber would visually identify the amount of money the recipient is to receive in front of camera 10 in view of the local technician, the remote technician, and the recipient. Thereafter the sending subscriber while in front of camera 10 would place the identified amount of money into the hands of the local technician, so that the remote technician and the recipient can observe the transfer being made. Thereafter the recipient's local technician in front of the camera 10 in the recipient's privacy booth 2, so as to be visible by the sending subscriber and the sending subscriber's local technician, would place the identified sum via cash/check/bank voucher into the hands of the recipient, individually counting out the currency for the recipient if a cash transaction was made. Before leaving his or her local privacy booth 2 the recipient would sign a paper (not shown) acknowledging receipt of the transferred sum and hand the receipt to his or her local technician. It is contemplated for large sums to be transferred in the form of a check or bank voucher so that control station 38 is not made a target of theft, vandalism, or extortion. If the money transfer was made to the recipient by bank voucher, the recipient's local technician would direct central processing unit 26 to capture and send an image of the recipient by fax or computer to a local bank for confirmation of the identity of recipient when he or she arrives at the bank to claim the transferred sum, thus greatly reducing the possibility of the fraudulent claiming of such sum by anyone other than recipient.

As FIG. 6 further describes, central processing unit 26 would maintain visual communication between corresponding subscribers after money transfer, until subscribers each exit their privacy booths 2 and notify their local technicians that the visual conference is concluded so that the local technicians can each then direct the local central processing units 26 to terminate their website connections. Subscribers could then schedule additional visual conferences, check e-mail messages sent to their assigned e-mail addresses through a nearby e-mail station 22, or send written e-mail messages to other people in the subscriber database through the local technician at control station 38 or through a nearby e-mail station 62 or 82. When all of the communication activity of the subscriber is concluded, the subscriber would then leave control station 38. When all subscribers have left control station 38, if the central processing unit 26 at control station 38 is networked with central processing units 26 at remote e-mail stations 62 or 82, the local technician would direct the central processing unit 26 at control station 38 to enter an inactive mode from which it can be rapidly returned to active status by subscribers at remote e-mail stations 62 or 82 upon demand, or from personal computers and personal electronic devices (not shown), who enter their assigned unique access codes on keypad 68 and cause the central processing unit 26 at control station 38 to direct scanner 86 to scan one or more recorded messages, access the subscriber database to find the e-mail address of each identified recipient subscriber, and send the messages to the proper e-mail addresses, or by subscribers at remote e-mail stations 62 or 82, as well as from personal computers and personal electronic devices (not shown), who direct central processing unit 26 to retrieve mail from their e-mail address after which printer 18 prints a copy of each e-mail message for the accessing subscriber, or in the alternative prints a statement for the subscriber that no new messages had been received.

Although not limited thereto, and it is considered within the scope of the present invention to have similar, comparable, and upgraded hardware and software in place of or in addition to some or all of the equipment identified below, for illustrative purposes the following electronic equipment would be minimally acceptable for building a preferred embodiment of the present invention to accomplish the communication objectives identified herein. It is contemplated that the central processing units 26 used in control stations 38 of the preferred embodiment have at least 128 MB 100 MHz Synchronous Dynamic Random Access Memory and at least 16 MB of non-removable storage, such as a Western Digital 16 MB hard disk drive, as well as an ABIT BX-6 mainboard with an Intel Pentium III 500 MHz processor. In addition, it is contemplated for each central processing unit 26 in control stations 38 to have a SoundBlaster or comparable audio card, and a video card with at least a peak fill rate of 250 million bilinear filtered, multi-textured pixels per second; up to 8.3 million triangles per second at peak rates; a 2.4 GB/sec total memory bandwidth; 100% hardware triangle setup engine; TwiN-Textel (TNT) dual 32-bit 3D rendering pipeline; a 2 texture mapped, lit pixels per clock cycle; and single pass multi-texturing support such as DirectX®8.X and OpenGL® ICD. Further, the communications sub-system in each central processing unit 26 of control stations 38 in the present invention would preferably have a 10/100 Base T autodetect PCI or comparable network interface card; Class 1 and 2.0 Group III 14.4 Kbps send and receive fax capability compatible with ITU and Bell standards from 56 Kbps down to 1200 bps, V.42/MPN 2-4 error control, V.42 bis/MPN 5 data compression, ITU V.90 56 Kbps, x2™ technology 56 Kbps download, and ITU V.34 33.6 Kbps; as well as a T1/Fractional T1 router with integrated DSU/CSU; standard and extended access control lists (ACLs); Lock and Key (dynamic ACLs) context-based access control (CBAC); IPSec tunneling with data encryption standard (DES); Layer 2 Forwarding (L2F) and Layer 2 Tunneling Protocol (L2TP); attack detection and prevention; and router/route authentication, authorization, and accounting such as PAP/CHAP, TACACS+, and RADIUS. Encryption software would also be preferred to protect the privacy of subscriber access codes and other information in the subscriber database.

Also, and although not limited thereto and provided herein only as an illustrative example, in the present invention camera 10 would preferably be capable of 16.7 million color, live video capture up to 30 frames per second at resolutions of 352×288 and up to 15 frames per second at 640×480; a focusable lens with a range of 3 inches to infinity; 640×480 pixel true-color CMOS sensor; and a USB port or a USB hub interface. Speakers 8 in the present invention would preferably be Creative Labs Model C8W200 or equivalent with built-in amplifier and magnetically shielded satellites. Keyboard 16 in the present invention would preferably be an industrial membrane keyboard with a NEMA 4X Stainless Steel enclosure, an Integrated Pointing Device, a built-in static shield, and embossed key borders. High resolution monitor 12 in the present invention would preferably have a minimum viewable image size that is 19.8 inches measured diagonally, 90 deflection, a maximum resolution of 1600×1200@85 Hz, an aperture grille pitch ranging between 0.25 and 0.27 mm, a horizontal scan range of 30–107 kHz, a vertical scan range of 46–160 Hz, and 100–240V AC 50/56 Hz power requirements. Further, the defining criteria for the scanner 86 and printer 18 used in each e-mail station 22, 62, or 82 would vary depending upon the number of subscribers anticipated to access the e-mail station 22, 62, and 82 within a desired maintenance period. The paper storage capacity, speed of printing or scanning, as well as image quality and mechanical reliability would be among the factors considered in the selection of a printer 18 or scanner 86 for each individual location where an e-mail station 22, 62, or 82 is set up for use.

It is therefore contemplated for the present invention to include a wide variety of communication and financial transactions, including transactions that are consumer-to-consumer, consumer-to-business, business-to-consumer, business to employees, employee-to-business, business-to-business, business-to-government, consumer-to-government, government-to-business, and government-to-consumer. Also, in addition to the applications provided above, it is also considered to be within the scope of the present invention for recurring bills that have bar codes, such as those for utilities, credit card payments, mortgage payments, and department store purchases, to be paid using the network website and e-mail stations 22, 62, and 82, or a personal computer or personal electronic device incorporating scanning technology, whereby all that the subscriber must do is place the bills one by one through the scanner, after which network computer will recognize the bar code on each bill or invoice and pay all or part of the amount due at the subscriber's direction. Although a letter and check could be generated for mailing by the subscriber, it is preferred that any payment be made by electronically forwarding the finds to the creditor. The network could provide a form for use by subscribers unskilled in computer operation, and which could be easily read by OCR technology, through which the unskilled subscriber could give the computer instructions about bill payment. Another application is for a subscriber to conduct on-line shopping via the network website, and then pick up packages through one of network control stations. Also, if someone were lost while traveling, he or she could find a hotel lobby or restaurant with a remote e-mail/ATM station 62 or 82, and obtain written or oral directions to the intended destination. Should someone be ahead of schedule on a trip and decide to visit an additional museum, tickets could be purchased through the network website so that when the travelers arrive at the museum they will not have to waste time standing in a ticket line. Any monitor 12 or screen 68 could be a touch screen or digital screen with screensaver icons that would be available for purchase so that banks and mortgage companies could advertise loan services, real estate office could show houses, motels and resorts could show resort or vacation package deals through full motion video. Travelers could also periodically transfer could also periodically transfer money to smart cards for micropayments, such as the amount needed for a drink, snack, or to make a phone call. Further international voice mail can eliminate expensive collect calls, whereby a scanned or written message can be delivered by the network to any designated voice mail box world wide, so that the sender does not have to repeatedly call in attempts to find the person at home. Further, cashier services in convenience stores could be made safer with variations of the remote email/ATM stations 62 or 82 of the present invention. The bar codes on purchased goods could be read by scanning technology, with no cash exchanging hands between customer and store clerk. The clerk's presence would only be required for making certain that all items are properly scanned prior to the conclusion of a purchase transaction. As an added layer of security protection for both store and subscriber, the purchaser's photo would be taken at the time of purchase. Money transfer via a personal computer or other electronic device into a college student's bank account or debit card account, or sending cash that can be picked up at a control station or remote e-mail/ATM station, can be accomplished through the network website of the present invention from home, the office, or while on vacation. The parent is benefited by a less expensive transfer, while the student received the benefit of quick receipt of funds. Although the network will charge a fee for transactions, the network will give subscribers less expensive options to conduct many types of telecommunication and financial transactions, with many of the transactions being accomplished in a much timelier manner.

What is claimed is:

1. A computer-aided telecommunication system that would allow subscribers who are part of a subscriber database, who may be unskilled in computer operation, those not having available to them the necessary personal computer equipment to conduct real-time visual communication with others, and subscribers from personal computers and other personal electronic equipment having on-line access, to conduct a wide variety of telecommunication and financial transactions a cost that is relatively low when compared to communication and financial transaction alternatives, in addition to providing an option for subscribers to promptly and securely transfer money from one to the other during a visual communication with instant on-camera money transfer confirmation, other money transfer with e-mail/voice mail confirmation, purchase goods and services, obtain still and moving images of themselves and any other person participating in a visual communication, transfer written and pictorial information to others in the subscriber database, and conduct communication with customer service representatives about goods and services, said system comprising:

an Internet website configured for visual and e-mail communication between subscribers who are part of a subscriber database and located remotely from one another;

at least two privacy booths, each in a location accessible to those of said subscribers desiring to participate in real-time visual communications with remote ones of said subscribers, each of said privacy booths creating an area where audio and visual recordings can be made and having high resolution image display means adapted for showing said subscribers and any accompanying visual correspondents participating in a visual communication with remote participants, including both said subscribers and people accompanying said subscribers, a clear real-time image of the remote participants while they remain positioned within a distant one of said privacy booths; live image capture means adapted for digitizing images of said subscribers and said accompanying visual correspondents in one said privacy booth and transmission through said Internet website to the distant one of said privacy booths used by said remote participants; at least one microphone configured for capturing sounds made by said subscribers and accompanying visual correspondents and transmission through said Internet website to the distant one of said privacy booths used by said remote participants; components selected from a group consisting of telephones, telephones providing direct communication to remotely located customer service personnel and pneumatic tube transport systems and speaker means within each of said enclosed rooms adapted for projecting sounds made in the distant one of said privacy booths by said remote participants to said subscribers and said accompanying visual correspondents in said privacy booth, and wherein controls for said high resolution image display means, said live image capture means, said microphone, and said audio speakers in said privacy booth remain substantially inaccessible to subscribers and said accompanying visual correspondents to prevent malfunction and preserve optimum performance of said high resolution image display means, said live video capture means, said microphone, and said audio speakers;

at least two control stations, at least one of said privacy booths being associated with each of said control stations, each of said control stations having a central processing unit with modem means for accessing said Internet website; scanner means electronically connected to said central processing unit for capturing and digitizing images of written and pictorial information for e-mail transfer from one subscriber to any of the subscribers in the subscriber database without said central processing unit maintaining a permanent record thereof; a computer keyboard electronically connected to said central processing unit; printer means electronically connected to said central processing unit for creating high resolution copies of written and pictorial information transferred to recipient subscribers by e-mail and which become promptly available to recipient subscribers when they reveal a uniquely assigned access code to said central processing unit through said keyboard, and also for printing still images of visual communication participants; fax means also electronically connected to said central processing unit for transmission of high resolution images of money receiving subscribers participating in a visual communication who receive a money sum by way of a bank voucher, as well as transmission of corresponding voucher information, to a bank selected by the money receiving subscriber so that representatives at the selected bank are able to readily confirm the identify the money receiving subscriber and know how much to pay the money receiving subscriber when the money receiving subscriber presents the voucher to the bank to claim the transferred money sum amount, the selected bank being one of several banks conveniently accessible from the one of said privacy booths in which the visual communication was conducted during which the money receiving subscriber received the bank voucher and which through prior arrangement has agreed to transfer money sums in exchange for such bank vouchers; video recording means electronically connected to said central processing unit for transferring to videotape without said central processing unit maintaining a permanent record thereof a copy of moving images of subscribers, remote subscribers, and other accompanying people captured during a visual communication for immediate delivery at the conclusion thereof to each participant of the visual communication requesting in advance a preserved copy of said images; and at least one electronic technician having skills for activating said central processing units, said modem means, said scanner means, said printer means, said fax means, and said video recording means to implement private and secure transfer of visual communication, money, recorded messages, and printed pictorial information between remotely located subscribers; and data transfer means between each of said privacy booths and a nearby one of said control stations for achieving electronic connection between said privacy booths and said control stations as well as two-way electronic data communication therebetween.

2. The system of claim 1 wherein said privacy booths each further comprise objects selected from a group consisting of writing surfaces and pieces of furniture configured and dimensioned for comfortably seating subscribers and accompanying visual correspondents.

3. The system of claim 1 wherein said privacy booths each further comprise components selected from a group consisting of windows with permanently closed panes, windows with a least one sliding pane, audio signaling means for capturing the attention of a skilled electronic technician at said control station through use of sounds, and visual signaling means for capturing the attention of a skilled electronic technician at said control station through use of steady and intermittently operating lights.

4. The system of claim 1 further comprising at least one e-mail station for independent access by subscribers in the subscriber database to written and pictorial information transferred to them by e-mail through said Internet website, said system also comprising data transfer means between said e-mail station and one of said control stations for achieving electronic connection between said e-mail station and said control station as well as two-way electronic data communication therebetween.

5. The system of claim 4 wherein each of said e-mail stations comprise components selected from a group consisting of computer keyboards, computer printers, telephones, telephones having direct communication with remotely located customer service personnel, equipment configured for taking at least one fingerprint of a user, equipment configured for taking a voiceprint of a user, equipment configured for taking a digital photograph of a user, and equipment configured for taking personal information of users, display screens, and bank connected automated teller machines.

6. The system of claim 5 wherein said automated teller machines in said email stations are configured for transfer of money within said system from a sending one of said subscribers to an intended recipient subscriber.

7. The system of claim 1 wherein said data transfer means between said control stations and each of said privacy booths as well as each of said e-mail stations is selected from a group consisting of data transfer cables and wireless connection devices.

8. The system of claim 1 further comprising at least one remote e-mail station for independent e-mail transfer of written and pictorial information through said Internet website by subscribers in the subscriber database, as well as independent access by the subscribers through said Internet website to e-mail transferred written and pictorial information sent to them, said system also comprising remote data transfer means through said Internet website between said remote e-mail station and one of said control stations.

9. The system of claim 8 wherein each of said remote e-mail stations used comprises components selected from a group consisting of central processing units, computer keyboards, computer printers, scanners, fax machines, keypads, display screens, automated teller machines, telephones, telephones having direct communication with remotely located customer service personnel, equipment configured for taking at least one fingerprint of a user, equipment configured for taking a voiceprint of a user, equipment configured for taking a digital photograph of a user, and equipment configured for taking personal information of users, coin accepting receptacles, currency accepting receptacles, debit card reading receptacles, credit card reading receptacles, locks for safeguarding currency and coins deposited into said coin accepting receptacles and said currency accepting receptacles, and maintenance access means for routine and emergency servicing of said central processing units, said computer printers, said scanners, said automated teller machines, said display screens, said computer keyboards, said receptacles, and said fax machines.

10. The system of claim 9 wherein said automated teller machines in said remote email stations are configured for transfer of money within said system from a sending one of said subscribers to an intended recipient subscriber.

11. The system of claim 1 wherein said privacy booths are each configured as enclosures in which sound produced inside said enclosure is not easily heard by anyone positioned immediately outside thereof, and wherein at least two of said enclosures are positioned remotely from one another in locations accessible to subscribers needing distant communication.

12. The system of claim 1 further comprising security means for verification of subscriber identity that is selected from a group consisting of equipment configured for taking and storing at least one fingerprint of a user and fingerprint recognition software configured to identify matching fingerprints, equipment configured for taking and storing a voiceprint of a user and voiceprint recognition software configured to identify matching voiceprints, equipment configured for taking and storing a digital photograph of a user and digital image recognition software configured to identify matching digital photographs, and equipment configured for taking and storing personal information of users and recognition software configured to identify matching personal information.

13. The system of claim 1 further comprising computer storage means adapted for identifying and securely retaining at least a portion of funds transferred within said system for subscribers and recipient subscribers until the retained funds are needed for other use.

14. A The system of claim 1 wherein said privacy booths are equipped for bank teller and other financial service transactions selected from a group consisting of sending money to remote individuals via an ATM, paying bills, cashing checks, issuing paychecks, exchanging currencies, opening accounts, viewing bank statements, obtaining purchasing pre-paid telephone cards, purchasing pre-paid debit cards, purchasing money orders, preparing paperwork for loans, purchasing transportation and entertainment tickets, purchasing goods and services, groceries and gas, viewing video advertising for products and services, purchasing pre-paid software applications, purchasing bandwidth to send large files for videoconferencing purposes, and pre-paying entertainment costs.

15. The system of claim 1 further comprising said email stations and said remote email stations configured for operation so as to provide non-subscribers with services in exchange for prepayment of designated unit costs.

16. The system of claim 1 further comprising stand-alone e-mail/ATM station network accessing units configured for bank teller transactions, financial service transactions, purchase transactions, and communication activities selected from a group consisting of consumer-to-consumer transactions, consumer-to-business transactions, business-to-consumer transactions, business-to-employees transactions, employee-to-business transactions, business-to-business transactions, business-to-government transactions, consumer-to-government transactions, government-to-business transactions, government-to-consumer transactions, sending money to remote individuals, sending money to a receiver by sending a security code in an e-mail message that gives the receiver access to money in an established account, paying bills, paying recurring bills using bar code technology, website shopping with package pick-up via use of said control stations, cashing checks, paying employees via a virtual account maintained within said system, exchanging currencies, opening virtual bank accounts within said system and conventional bank accounts outside of said system, viewing bank statements, obtaining purchasing pre-paid telephone cards, purchasing pre-paid debit cards, purchasing money orders, preparing paperwork for loans, sending e-mail, sending still and moving photos, obtaining oral and written directions to an intended destination, purchasing transportation and entertainment tickets, obtaining information about nearby events, activities, museums, and other attractions in an unfamiliar locale, viewing virtual tours of real estate, motels, and vacation package deals, viewing video advertising for products and services, sending written and oral international communication to others, purchasing goods and services, purchasing groceries, gasoline, and other consumable products, purchasing pre-paid software applications, purchasing bandwidth to send large files for videoconferencing purposes, and pre-paying entertainment costs.

17. The system of claim 16 wherein said stand-alone e-mail/ATM station network accessing units are further configured for the option of providing automatic follow-up notification subsequent to a transaction conducted through use of said accessing units, with said notification being made through use of electronic equipment selected from a group consisting of devices capable of sending and receiving e-mail messages, pagers, voice mail equipment, and mobile phone message devices, and the type of said notification and recipients of said notification being originator-selected.

18. The system of claim 16 wherein said stand-alone e-mail/ATM station network accessing units are further configured for use by customers in purchasing goods and services from store clerks and servicing technicians where the financial part of the purchase transaction is conducted via said stand-alone e-mail/ATM station network accessing units and no cash exchanges hands.

19. The system of claim 17 wherein said stand-alone e-mail/ATM station network accessing units are further configured for use by customers in purchasing goods and services from store clerks and servicing technicians where the financial part of the purchase transaction is conducted via said stand-alone e-mail/ATM station network accessing units and no cash exchanges hands.

20. The system of claim 17 wherein said Internet website is further configured for access by customers using personal computers and devices capable of sending and receiving e-mail messages to create a communication link between said personal computers and said privacy booths, a communication link between said personal computers and said stand-alone e-mail/ATM station network accessing units, a communication link between said personal computers and said devices capable of sending and receiving e-mail messages, a communication link between said privacy booths and said stand-alone e-mail/ATM station network accessing units, a communication link between said privacy booths and said devices capable of sending and receiving e-mail messages, and a communication link between said stand-alone e-mail/ATM station network accessing units and said devices capable of sending and receiving e-mail messages.

21. The system of claim 16 wherein said Internet website is further configured for access by personal computers and devices capable of sending and receiving e-mail messages to create a communication link between said personal computers and said privacy booths, a communication link between said personal computers and said stand-alone e-mail/ATM station network accessing units, a communication link between said personal computers and said devices capable of sending and receiving e-mail messages, a communication link between said privacy booths and said stand-alone e-mail/ATM station network accessing units, a communication link between said privacy booths and said devices capable of sending and receiving e-mail messages, and a communication link between said stand-alone e-mail/ATM station network accessing units and said devices capable of sending and receiving e-mail messages.

22. A method of computer-aided communication between subscribers who are part of a subscriber database and located remotely from one another, and who may be unskilled in computer operation, which allows private transfer of recorded messages and pictorial information between such subscribers, private real-time visual communication between them and others accompanying them, secure transfer of money between subscribers during a private visual communication with immediate money transfer confirmation, and both still and moving image capture of subscribers and others accompanying them during a visual communication, said method comprising the steps of:

providing an Internet website configured for visual and e-mail communication between remote people, two technicians skilled in computer and electronic equipment operation, two privacy booths each having a high resolution monitor, a live video capture camera, audio speakers, a microphone, two control stations each having a central processing with a network interface card, a soundcard, a videocard and a router, a fax device with data compression capability, a computer monitor, a keyboard, a printer, a scanner, and a video recorder, and also providing two-way data transfer means and telephone service access means;

using said central processing unit to create a database of subscribers desiring to have real-time visual communication with one or more subscribers in the database who are positioned remotely therefrom and people accompanying the remote subscribers;

assigning a unique access code and a unique e-mail address to each of the subscribers in the database;

storing access code, e-mail address information, and subscriber identification information in said subscriber database in encrypted form for cross-referencing access by said central processing unit but not by subscribers;

locating said privacy booths in positions remote from one another and readily accessible to database subscribers desiring visual communication with one another;

positioning one of said control stations in close proximity to each of said privacy booths;

using said two-way data transfer means to connect said central processing unit in each of said control stations to one of said fax devices, computer monitors keyboards, printers, scanners, and video recorders, as well as to said high resolution monitor, said live video capture camera, said audio speakers, and said microphone in the nearby one of said privacy booths;

one of the subscribers approaching a conveniently located one of said control stations;

said subscriber entering his or her unique access code;

said computer collecting current subscriber identification information from subscriber at the time of entering said unique access code and comparing said current identifying information to identifying information initially collected;

allowing said subscriber to continue in desired transactions when said both sets of said subscriber identifying information is identical;

if only e-mail receipt is desired and after the skilled technician has connected said central processing unit to said Internet website through one of said telephone service access lines, the subscriber revealing his or her assigned access code to said central processing unit using said control station keyboard and immediately thereafter obtaining copies of e-mail messages from said control station printer;

if e-mail transmission of a recorded message and pictorial information is desired, after providing payment therefore to a skilled technician at said control station the subscriber handing to the skilled technician the recorded message and pictorial information for which transmission is desired, the subscriber identifying the name of all subscribers intended for receipt of the e-mail transmission, the skilled technician connecting said central processing unit to said Internet website through said telephone service access means and typing the names of recipient subscribers on said control station keyboard, the skilled technician placing the unread recorded message and pictorial information into said control station scanner and activating said scanner, said central processing unit accessing the subscriber database to identify the e-mail addresses of identified recipient subscribers and sending the scanned images to the identified e-mail addresses without creating a permanent file therein for the scanned images, and then the skilled technician retrieving the unread recorded message and pictorial information from said scanner and returning it to the sending subscriber;

if a visual conference with a remotely located subscriber in the subscriber database is desired, each visual communication participant consisting of subscribers and any people accompanying the subscribers entering a nearby privacy booth, a skilled technician at each privacy booth establishing access to said Internet website, in addition to activating and confirming optimum operation of said speakers, said microphones, said high resolution monitors, and said live video capture cameras, each of said visual communication participants optionally sending a signal to the nearby one of said skilled technicians to activate said central processing unit and cause said central processing unit to direct the capture and printing of images of visual communication participants at designated times for distribution to the requesting visual communication participants without file copies of the images being made, visual communication participants also optionally identifying to the nearby one of said skilled technicians names of receiving subscribers in the subscriber database to which it is desired that copies of the images be sent by e-mail and requesting said skilled technicians to send a copy of the images by e-mail without causing a copy of the images to be maintained by said central processing unit, each of said visual communication participants optionally sending a signal to the nearby one of said skilled technicians to activate said central processing unit and cause said central processing unit to direct the capture and printing of moving images of visual communication participants at designated times for distribution in the form of a videotape to the requesting visual communication participants without file copies of the moving images being made, each of said visual communication participants optionally transferring money to another visual communication participant by the donor participant visually identifying the amount of money to be transferred to the money receiving participant in front of camera in view of a skilled technician in each of said privacy booths and the money receiving participant, the donor participant while in front of camera and so that the remote technician and the money receiving participant can observe the transfer being made, placing the identified amount of money into the hands of the adjacent one of said skilled technicians, the one of said skilled technicians adjacent to the money receiving participant in front of the camera and so as to be visible by donor participant and the one of said skilled technicians adjacent to the donor participant, placing the identified amount of money into the hands of the money receiving participant, individually counting out the currency for the money receiving participant if a cash transaction is made, and the money receiving participant signing a receipt for the identified amount of money and handing the receipt to the adjacent one of said skilled technicians, and after said visual communication is concluded said participants each leaving the adjacent ones of said privacy booths, notifying the adjacent ones of said skilled technicians that the visual communication is concluded, each of the skilled technicians giving the still and moving images captured during the visual communication to the subscribers previously requesting them, and said skilled technicians each then directing the central processing units to terminate said Internet website connections.

23. The method of claim 22 further providing steps selected from a group consisting of providing a writing surface, providing at least one piece of furniture upon which visual communication participants can be seated, providing at least one piece of furniture upon which visual communication participants can be seated and said visual communication participants using said furniture, and providing a writing surface and the money receiving participant using said writing surface for signing the receipt.

24. The method of claim 22 wherein the step of providing said privacy booths further comprises the step of providing privacy booths with components selected from a group consisting of windows with permanently closed panes, windows with a least one sliding pane, telephones, telephones in direct communication with remotely located customer service personnel, equipment configured for taking at least one fingerprint of a user, equipment configured for taking a voiceprint of a user, equipment configured for taking a digital photograph of a user, and equipment configured for taking personal information of users, audio signals for capturing the attention of a skilled electronic technician at said control station, and visual signals for capturing the attention of a skilled electronic technician at said control station.

25. The method of claim 22 further comprising the step of providing e-mail stations for independent access without the help of a skilled technician by subscribers in the subscriber database to written and pictorial information transferred to them by e-mail through said Internet website, and the step of using a portion of said two-way data transfer cables to establish electronic communication between said e-mail station and one of said control stations.

26. The method of claim 25 wherein said automated teller machines in said email stations are configured for transfer of money within said system from a sending one of said subscribers to an intended recipient subscriber, and further comprising a step of said subscribers using said automated teller machines in said email stations to send money within said system to an intended recipient subscriber.

27. The method of claim 25 wherein the step of providing each of said e-mail stations further comprises the steps of providing e-mail station components selected from a group consisting of computer keyboards, computer printers, display screens, telephones, telephones in direct communication with remotely located service personnel, equipment configured for taking at least one fingerprint of a user, equipment configured for taking a voiceprint of a user, equipment configured for taking a digital photograph of a user, and equipment configured for taking personal information of users, and bank connected automated teller machines.

28. The method of claim 27 further comprising the steps of providing e-mail stations having bank connected automated teller machines and subscribers optionally accessing said automated teller machine with bank-assigned access codes to obtain money to pay for e-mail transmissions and for transfer to money receiving participants during visual communications.

29. The method of claim 28 further comprising a step of money transfer to said identified recipient subscriber through sending subscriber use of said e-mail stations.

30. The method of claim 27 wherein the step of subscriber payment for e-mail transmissions is selected from a group consisting of pre-payment through payment of recurring subscription fees, using a smart card for micropayments, using a credit card, using a debit card, using cash, on-site payment of the transmission amount to a skilled technician at a control station, and on-site placement of the transmission amount directly into remote e-mail stations.

31. The method of claim 22 further comprising the step of providing remote e-mail stations for independent transfer of written and pictorial information by subscribers to other subscribers in the subscriber database through said Internet website without the help of a skilled technician, independent access without the help of a skilled technician by subscribers in the subscriber database to written and pictorial information transferred to them by e-mail through said Internet website, the step of using said telephone service access means lines to establish data transfer communication between said remote e-mail stations and said control stations, and the step of skilled technicians directing said central processing unit at said control station to enter an inactive mode after visual communications are concluded from which it can be rapidly returned to active status by subscribers paying e-mail transmission fees at said remote e-mail stations.

32. The method of claim 31 wherein the step of providing each of said remote e-mail stations further comprises the steps of providing remote e-mail station components selected from a group consisting of central processing units, computer keyboards, computer printers, scanners, fax machines, telephones, telephones in direct communication with remotely located customer service personnel, equipment configured for taking at least one fingerprint of a user, equipment configured for taking a voiceprint of a user, equipment configured for taking a digital photograph of a user, and equipment configured for taking personal information of users, keypads, display screens, automated teller machines, coin accepting receptacles, currency accepting receptacles, debit card reading receptacles, credit card reading receptacles, locks for safeguarding currency and coins deposited into said coin accepting receptacles and said currency accepting receptacles, and maintenance access means for routine and emergency servicing of said central processing units, said computer printers, said scanners, said automated teller machines, said display screens, said computer keyboards, said receptacles, and said fax machines.

33. The method of claim 32 further comprising the steps of providing remote e-mail stations having bank connected automated teller machines and payment for e-mail transmissions being selected from a group consisting of e-mail sending subscribers paying recurring subscription fees, using a smart card for micropayments, using a credit card, using a debit card, using cash brought to said remote e-mail station, and the e-mail sending subscriber accessing said automated teller machine with bank-assigned access codes to obtain money to pay for e-mail transmissions.

34. The method of claim 32 further comprising a step of money transfer to said identified recipient subscriber through sending subscriber use of said remote e-mail stations.

35. The method of claim 32 wherein said automated teller machines in said remote email stations are configured for transfer of money within said system from a sending one of said subscribers to an intended recipient subscriber, and further comprising a step of said subscribers using said automated teller machines in said remote email stations to send money within said system to an intended recipient subscriber.

36. The method of claim 22 wherein the step of the skilled technician adjacent to the money receiving participant placing the identified amount of money into the hands of the money receiving participant further comprises the identified amount of money transferred being selected from a group consisting of cash, check, and bank voucher.

37. The method of claim 36 wherein the step of transferring the identified amount of money by bank voucher further comprises the steps of the one of the skilled technicians adjacent to the money receiving visual communication participant directing said central processing unit to capture and send an image of the money receiving participant by fax or computer to a bank for confirmation of the identity of the money receiving participant upon arrival at the bank to claim the transferred money sum.

38. The method of claim 22 further comprising the steps of assigning a security code to at least one of said desired transactions, the sending one of said subscribers independently relaying said security code to said identified recipient subscriber, and said recipient subscriber producing said security code in advance of receiving any transfer from said sending subscriber.

39. The method of claim 38 wherein said step of independently relaying said security code can be accomplished by using electronic equipment selected from a group consisting of devices capable of sending and receiving e-mail messages, pagers, voice mail equipment, and mobile phone message devices.

40. The method of claim 39 wherein said communication accomplished between said sending subscriber and said intended recipient subscriber via devices capable of sending and receiving e-mail messages, pagers, voice mail equipment, and mobile phone message devices is automatically generated by said system and can include communication selected from a group consisting of identification of security codes, information about money transfer services conducted via said system, information about purchases made using said system, and general non-money transfer related information.

41. The method of claim 22 further comprising the steps of providing at least one personal computer with live capture camera and microphone that is positioned for sending subscriber use and transfer of money from said sending subscriber to said identified recipient subscriber through sending subscriber use of said personal computer.

42. The method of claim 22 further comprising the step of providing security means for verification of subscriber identity that is selected from a group consisting of equipment configured for taking and storing at least one fingerprint of a user and fingerprint recognition software configured to identify matching fingerprints, equipment configured for taking and storing a voiceprint of a user and voiceprint recognition software configured to identify matching voiceprints, equipment configured for taking and storing a digital photograph of a user and digital image recognition software configured to identify matching digital photographs, and equipment configured for taking and storing personal information of users and recognition software configured to identify matching personal information.

43. The method of claim 22 further comprising the step of providing computer storage means adapted for identifying and securely retaining funds transferred within said system for subscribers and recipient subscribers, and the step of said subscribers and recipient subscribers optionally using said computer storage means to retain at least a portion of said transferred funds until the retained funds are needed for other use.

44. The method of claim 22 further comprising the steps of providing a plurality of receipts and obtaining a signature on at least one of said receipts for confirming purposes when transfers are made between sending subscribers and recipient subscribers.

45. The method of claim 22 further comprising the steps of providing said privacy booths with equipment configured to conduct bank teller and other financial service transactions selected from a group consisting of sending money to remote individuals via an ATM, paying bills, cashing checks, issuing paychecks, exchanging currencies, opening accounts, viewing bank statements, obtaining purchasing pre-paid telephone cards, purchasing pre-paid debit cards, purchasing money orders, preparing paperwork for loans, purchasing transportation and entertainment tickets, purchasing goods and services, groceries and gas, viewing video advertising for products and services, purchasing pre-paid software applications, purchasing bandwidth to send large files for videoconferencing purposes, and pre-paying entertainment costs, and said subscribers optionally conducting said services from one of said privacy booths.

46. The method of claim 22 further comprising the step of providing email stations and remote email stations which are configured for operation so as to provide services to non-subscribers who have prepaid designated unit costs, and said non-subscribers using said email stations and said remote email stations to obtain selected services on a pre-paid basis.

47. The method of claim 22 further comprising a step of using smart cards for storing money transferred by said system and sufficient subscriber information on said smart card to identify ownership of said transferred money stored thereon.

48. The method of claim 22 further comprising the steps of providing stand-alone e-mail/ATM station network accessing units configured for bank teller transactions, financial service transactions, purchase transactions, and communication activities selected from a group consisting of consumer-to-consumer transactions, consumer-to-business transactions, business-to-consumer transactions, business-to-employees transactions, employee-to-business transactions, business-to-business transactions, business-to-government transactions, consumer-to-government transactions, government-to-business transactions, government-to-consumer transactions, sending money to remote individuals, sending money to a receiver by sending a security code in an e-mail message that gives the receiver access to money in an established account, paying bills, paying recurring bills using bar code technology, website shopping with package pick-up via use of said control stations, cashing checks, paying employees via a virtual account maintained within said system, exchanging currencies, opening virtual bank accounts within said system and conventional bank accounts outside of said system, viewing bank statements, purchasing pre-paid telephone cards, purchasing pre-paid debit cards, purchasing money orders, preparing paperwork for loans, sending e-mail, sending still and moving photos, obtaining oral and written directions to an intended destination, purchasing transportation and entertainment tickets, obtaining information about nearby events, activities, museums, and other attractions in an unfamiliar locale, viewing virtual tours of real estate, motels, and vacation package deals, viewing video advertising for products and services, sending written and oral international communication to others, purchasing goods and services, purchasing groceries, gasoline, and other consumable products, purchasing pre-paid software applications, purchasing bandwidth to send large files for videoconferencing purposes, and pre-paying entertainment costs.

49. The method of claim 48 further comprising the step of providing stand-alone e-mail/ATM station network accessing units configured for use by customers in purchasing goods and services from store clerks and servicing technicians where the financial part of the purchase transaction is conducted via said stand-alone e-mail/ATM station network accessing units and no cash exchanges hands, and the step of the customer selecting the type of payment desired, and the step of said stand-alone e-mail/ATM station network accessing units processing the selected type of payment.

50. The method of claim 48 further comprising the step of providing an Internet website configured for access by customers using personal computers and devices capable of sending and receiving e-mail messages to create a communication link between said personal computers and said privacy booths, a communication link between said personal computers and said stand-alone e-mail/ATM station network accessing units, a communication link between said personal computers and said devices capable of sending and receiving e-mail messages, a communication link between said privacy booths and said stand-alone e-mail/ATM station network accessing units, a communication link between said privacy booths and said devices capable of sending and receiving e-mail messages, and a communication link between said stand alone e-mail/ATM station network accessing units and said devices capable of sending and receiving e-mail messages, and the step of customers using said communication links of personal computer to privacy booth, personal computer to stand-alone e-mail/ATM station network accessing unit, personal computer to device capable of sending and receiving e-mail messages, privacy booth to stand-alone e-mail/ATM station network accessing unit, privacy booth to device capable of sending and receiving e-mail messages, and stand-alone e-mail/ATM station network accessing unit to device capable of sending and receiving e-mail messages to conduct communication and financial transactions.

51. The method of claim 48 further comprising the step of providing stand-alone e-mail/ATM station network accessing units that are configured to provide follow-up notification subsequent to any transaction conducted through use of said accessing units, the step of the originator selecting the type of notification desired and the recipients of said notification, and the step of said stand-alone e-mail/ATM station network accessing units providing said selected notification through the use of electronic equipment selected from a group consisting of devices capable of sending and receiving e-mail messages, pagers, voice mail equipment, and mobile phone message devices.

52. The method of claim 51 further comprising the step of providing stand-alone e-mail/ATM station network accessing units configured for use by customers in purchasing goods and services from store clerks and servicing technicians where the financial part of the purchase transaction is conducted via said stand-alone e-mail/ATM station network accessing units and no cash exchanges hands, and the step of the customer selecting the type of payment and notification desired, and the step of said stand-alone e-mail/ATM station network accessing units processing the selected type of payment and notification.

53. The method of claim 51 further comprising the step of providing an Internet website configured for access by customers using personal computers and devices capable of sending and receiving e-mail messages to create a communication link between said personal computers and said privacy booths, a communication link between said personal computers and said stand-alone e-mail/ATM station network accessing units, a communication link between said personal computers and said devices capable of sending and receiving e-mail messages, a communication link between said privacy booths and said stand-alone e-mail/ATM station network accessing units, a communication link between said privacy booths and said devices capable of sending and receiving e-mail messages, and a communication link between said stand-alone e-mail/ATM station network accessing units and said devices capable of sending and receiving e-mail messages, and the step of customers using said communication links of personal computer to privacy booth, personal computer to stand-alone e-mail/ATM station network accessing unit, personal computer to device capable of sending and receiving e-mail messages, privacy booth to stand-alone e-mail/ATM station network accessing unit, privacy booth to device capable of sending and receiving e-mail messages, and stand-alone e-mail/ATM station network accessing unit to device capable of sending and receiving e-mail messages to conduct communication and financial transactions.

* * * * *